United States Patent
Kim

(10) Patent No.: US 8,527,848 B2
(45) Date of Patent: Sep. 3, 2013

(54) COOPERATIVE SYMBOL LEVEL NETWORK CODING IN MULTI-CHANNEL WIRELESS NETWORKS

(75) Inventor: Yong-Ho Kim, Gyeonggi-Do (KR)

(73) Assignee: LG Electronics Inc., Seoul (KR)

(*) Notice: Subject to any disclaimer, the term of this patent is extended or adjusted under 35 U.S.C. 154(b) by 308 days.

(21) Appl. No.: 12/988,940

(22) PCT Filed: Jun. 16, 2009

(86) PCT No.: PCT/KR2009/003216
§ 371 (c)(1),
(2), (4) Date: Oct. 21, 2010

(87) PCT Pub. No.: WO2010/005181
PCT Pub. Date: Jan. 14, 2010

(65) Prior Publication Data
US 2011/0041041 A1    Feb. 17, 2011

Related U.S. Application Data

(60) Provisional application No. 61/073,013, filed on Jun. 16, 2008.

(51) Int. Cl.
*H03M 13/00* (2006.01)

(52) U.S. Cl.
USPC ........................................................ 714/780

(58) Field of Classification Search
USPC .................. 714/780, 752, E11.032
See application file for complete search history.

(56) References Cited

U.S. PATENT DOCUMENTS

| | | | |
|---|---|---|---|
| 7,027,782 B2* | 4/2006 | Moon et al. | 455/102 |
| 7,400,607 B2 | 7/2008 | Kim et al. | |
| 2002/0172208 A1* | 11/2002 | Malkamaki | 370/400 |
| 2004/0037224 A1* | 2/2004 | Choi et al. | 370/235 |
| 2005/0108610 A1* | 5/2005 | Kim et al. | 714/748 |
| 2006/0146791 A1* | 7/2006 | Deb et al. | 370/352 |
| 2006/0291599 A1* | 12/2006 | Strodtbeck et al. | 375/347 |
| 2007/0260959 A1* | 11/2007 | Sidi et al. | 714/755 |
| 2008/0052602 A1* | 2/2008 | Albrecht et al. | 714/763 |
| 2008/0130883 A1* | 6/2008 | Agaian et al. | 380/54 |
| 2008/0155382 A1* | 6/2008 | Dong et al. | 714/784 |
| 2009/0003216 A1* | 1/2009 | Radunovic et al. | 370/237 |
| 2009/0201899 A1* | 8/2009 | Liu et al. | 370/338 |
| 2009/0204866 A1* | 8/2009 | Mishuku | 714/749 |
| 2009/0285148 A1* | 11/2009 | Luo et al. | 370/315 |
| 2010/0112957 A1* | 5/2010 | Kong et al. | 455/67.11 |

FOREIGN PATENT DOCUMENTS

| | | | |
|---|---|---|---|
| KR | 10-0594021 B1 | | 6/2006 |
| KR | 10-2007-0091883 | * | 9/2007 |
| KR | 10-2007-0091883 A | | 9/2007 |
| KR | 10-0827147 B1 | | 4/2008 |

* cited by examiner

*Primary Examiner* — Cynthia Britt
*Assistant Examiner* — Thien D Nguyen
(74) *Attorney, Agent, or Firm* — Birch, Stewart, Kolasch & Birch, LLP

(57) ABSTRACT

Disclosed is a new solution to maximize throughput in wireless networks even when unpredictable and time-varying error exist. The present invention adapts to take an advantage of a network coding at a symbol level in multi-channel wireless networks. By operating the network coding at the symbol level and using soft decision values, the present invention is able to exploit both time and cooperative diversity in realistic multi-channel wireless networks, to adapt to time-varying and bursty channel errors, and to efficiently collect as many correct symbols as possible at the receiver.

7 Claims, 16 Drawing Sheets

(a) Two hops.  (b) Three hops.

Downlink throughput

Uplink throughput

SV distribution of all bits

SV distribution of bad
bits

Throughput

Delay

Packet Delivery Rate

Throughput

Downlink throughput

UPlink throughput

Downlink

Uplink

● BS
● RS
☆ MS

Downlink throughput

Uplink throughput

Downlink

Uplink

COOPERATIVE SYMBOL LEVEL NETWORK CODING IN MULTI-CHANNEL WIRELESS NETWORKS

This application is the National Phase of PCT/KR2009/003216 filed on Jun. 16, 2009, which claims priority under 35 U.S.C. 119(e) to U.S. Provisional Application No. 61/073,013 filed on Jun. 16, 2008, all of which are hereby expressly incorporated by reference into the present application.

TECHNICAL FIELD

The present invention relates to a wireless communication system and a terminal providing a wireless communication service and to a method for controlling error protocols in a MAC (Medium Access Control) or PHY (Physical) layer in order to effectively maximize achievable throughput in wireless networks even when unpredictable and time-varying errors exist, and more particularly, to a network coding scheme at the symbol level using soft decision values in multi-channel wireless networks, thereby exploiting both time and cooperative diversity in realistic multi-channel wireless networks.

BACKGROUND ART

Multi-channel wireless networks represent a direction that most future 4G state-of-the-art wireless communication standards evolve towards, including IEEE 802.16 Wi-MAX and 3GPP Long Term Evolution (LTE). In both Wi-MAX and LTE, Orthogonal Frequency Division Multiple Access (OFDMA) is used at the physical layer. OFDMA uses a large number of orthogonal subcarriers to maximize spectral efficiency, and assigns different subsets to different users to achieve multiple access. It is common knowledge that errors are inherently present in unreliable wireless channels. The important challenge in designing error control protocols in the MAC or physical layer is to effectively maximize achievable throughput in various transmission scenarios in wireless networks even when unpredictable and time-varying errors exist.

In the Wi-MAX physical layer, Hybrid Automatic Retransmission reQuest (HARQ) is adopted as an error control protocol by combining an ARQ and a Forward Error Correction (FEC). In addition, a performance of HARQ can be further improved by packet soft combining. The performance of HARQ, especially in the context of Wi-MAX, has been thoroughly investigated in an information-theoretic fashion. However, a built-in reliability in the HARQ has to scarify some degree of resilience to time-varying channel conditions. In addition, the HARQ does not exploit the cooperative diversity in multi-path transmissions, as it is designed for a point-to-point channel. Therefore, an improved scheme to serve as a replacement of HARQ in the Wi-MAX physical layer is needed to be proposed.

In the context of 802.11-based wireless networks with a single, shared wireless broadcast channel, a partial packet recovery algorithm has been proposed to revise the traditional ARQ. In this proposal, the erroneous portions of the packet would be re-transmitted rather than retransmitting the entire packet. However, since the feedback message has to explicitly describe the positions of error bits in the packet, this proposal would likely incur significant overhead. Further, this proposal is not designed to support cooperative transmissions in a typical multi-path transmission scenario.

There is another proposal related to a cooperative packet recovery algorithm in 802.11-based networks, which is referred to as a SOFT. This proposal works by combining confidence values across multiple faulty receptions to recover a clean packet. This proposal may able to significantly improve the data delivery rate in 802.11-based networks, in static wireless environments. However, realistic channel conditions are time varying and bursty in multi-channel wireless networks, such as Wi-MAX networks. Therefore, the performance of SOFT under such condition is unclear.

There is another proposal related to a protocol for cooperative packet recovery by performing opportunistic routing on groups of correctly received symbols in a packet, which is referred to a MIXIT. This proposal may take advantage of the broadcast nature of 802.11-based wireless networks and perform random network coding across correct symbols in different packets. This proposal provides end-to-end error recovery by employing Maximum Rank Distance (MRD) codes for push based blind redundancy transmission. However, this proposal heavily relies on opportunistic listening and routing properties in multi-hop 802.11 networks, and can not be effectively applied to multi-channel wireless networks, such as IEEE 802.16 Wi-MAX. Moreover, due to the bounded MRD code rates, it will generate large amount of overhead and is not able to provide flexibility on feedback based on-demand retransmission.

DISCLOSURE OF INVENTION

Technical Solution

Therefore, an object of the present invention is to effectively maximize achievable throughput in wireless networks even when unpredictable and time-varying errors exist.

To achieve these and other advantages and in accordance with the purpose of the present invention, as embodied and broadly described herein, there is provided a method for transmitting data in wireless communication system, the method comprising: dividing an input bit stream into segments; adding error detection code (CRC) into each segments of the divided input bit stream in order to generate a packet; dividing the generated packet into a plurality of blocks with fixed size; coding each of the plurality of blocks using a random linear coding in order to generate coded block bits; mapping the coded block bits to a plurality of modulated symbols; and transmitting the plurality of modulated symbols.

To achieve these and other advantages and in accordance with the purpose of the present invention, as embodied and broadly described herein, there is also provided a method for receiving data in wireless communication system, the method comprising: receiving a plurality of modulated symbols; demodulating the received plurality of modulated symbols to acquire a plurality of soft decision values; selecting coded blocks according to a confidence value related to the plurality of soft decision values; and performing a random linear decoding with the selected coded blocks to restore a packet.

Also, to achieve these and other advantages and in accordance with the purpose of the present invention, as embodied and broadly described herein, there is also provided an apparatus for transmitting data in wireless communication system, the apparatus comprising: a packet generator adapted to generate a packet by adding error detection code into each segments of an input bit stream, wherein the generated packet is divided into a plurality of blocks with fixed size; an encoder adapted to code each of the plurality of blocks using a random linear coding in order to generate coded block bits; a modulator adapted to map the coded block bits to a plurality of modulated symbols; and an antenna adapted to transmit the plurality of modulated symbols.

Further, to achieve these and other advantages and in accordance with the purpose of the present invention, as embodied and broadly described herein, there is also provided an apparatus for receiving data in wireless communication system, the apparatus comprising: an antenna adapted to receive a plurality of modulated symbols; a demodulator adapted to demodulate the received plurality of modulated symbols to acquire a plurality of soft decision values, wherein coded blocks are selected according to a confidence value related to the plurality of soft decision values; and a decoder adapted to decode the selected coded blocks with a random linear decoding in order to restore a packet.

The foregoing and other objects, features, aspects and advantages of the present invention will become more apparent from the following detailed description of the present invention when taken in conjunction with the accompanying drawings.

MODE FOR THE INVENTION

One aspect of this disclosure relates to the recognition by the present inventors about the problems of the related art as described above, and further explained hereafter. Based upon this recognition, the features of this disclosure have been developed.

Although this disclosure is shown to be implemented in a specific mobile communication system, this disclosure may also be applied to other communication systems operating in conformity with different standards and specifications.

Hereinafter, description of structures and operations of the preferred embodiments according to the present invention will be given with reference to the accompanying drawings.

As aforementioned, a primary challenge in designing error control protocols in the MAC or physical layer is to effectively maximize achievable throughput in wireless networks even when unpredictable and time-varying errors exist. Network coding has been successfully applied to improve throughput in IEEE 802.11-based wireless networks with a shared broadcast channel. In state-of-the-art physical layer designs in multi-channel wireless networks (such as IEEE 802.16 Wi-MAX), however, the convenience of a shared wireless broadcast channel to perform opportunistic listening no longer exists, and Hybrid ARQ (HARM) is the predominant error control protocol in the physical layer, rather than plain ARQ in IEEE 802.11 MAC. Therefore, this disclosure proposes a 'Drizzle', a new solution to maximize throughput with the presence of errors, which takes advantage of network coding at the symbol level in multi-channel wireless networks. By operating at the symbol level and using soft decision values. The present invention is able to exploit both time and cooperative diversity in realistic multi-channel wireless networks, to adapt to time-varying and bursty channel errors, and to efficiently collect as many correct symbols as possible at the receiver.

Further, since the bit error probability varies across different bit positions in one modulation symbol and a corruption of the packet is largely due to the incurred errors on those bad bit positions, this disclosure proposes an efficient packet transmission framework by applying a novel scattered random network coding scheme. This scheme classifies the coded blocks into different classes. Transmitter and relays always scatter the bits of coded blocks that need protecting on good bit positions and the rest on bad bit positions. With such error separation, the error probabilities of protected blocks may increase significantly over multiple hops, which is helpful to achieve higher throughput compared with the tradition transmission scheme where all blocks share the same error rate.

This scattered random network coding is also able to improve the performance substantially in multi-hop mode of wireless networks.

Figure 1:
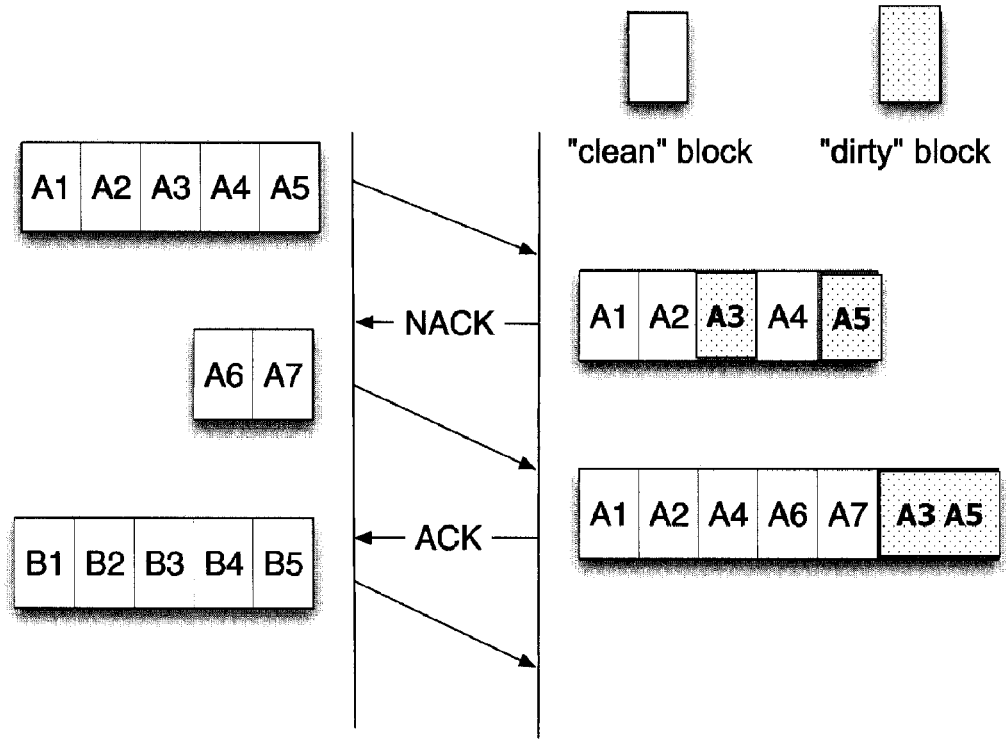
FIG. 1 illustrates a retransmission of error blocks over a single wireless link.

In this disclosure, it is proposed that a use of a network coding at the symbol level, which is used at a physical level. The present invention is carefully designed to fully embrace the characteristics of multi-channel wireless networks rather than using network coding at the packet level. When operating in the physical layer of multi-channel wireless networks such as Wi-MAX, the present invention shows two salient advantages. First, a sender only needs to retransmit dirty symbols, which are corrupted by channel errors after demodulation, rather than the entire packet. An illustrative example is shown in FIG. 1. As depicted in FIG. 1, the sender first divides each single packet into a number of (5 in the example) small blocks, each of which contains one or a small number of physical layer symbols used in modulation. All blocks are encoded using random linear codes, and the sender sends the packet by transmitting 5 of them (A1,A2, . . . , A5) to the receiver. In random linear codes operation, the sender is able to generate a virtually unlimited number of coded blocks using different sets of coefficients, and any n (required number of blocks for decoding) of these coded blocks can be used to decode by inverting a matrix of coding coefficients. This is referred to as the rateless property. Due to the rateless property of random linear codes used across the symbols in the packet, all the blocks within one packet are equally useful. In the example of FIG. 1, n is 5. Due to unreliable channels, the packet is corrupted. However, not all the bits within the packet share the same fate. Very often, only a small number of bits are in error; the rest are correct. In the example, block A3 and A5 are dirty, while A1, A2 and A4 are clean. Under this situation, the sender just needs to send two more coded blocks (A6 and A7) to the receiver, which can then be used towards correct decoding of the packet on the receiver, with a total of 5 clean blocks received. Clearly, as the size of a block is sufficiently small, the error control of the present invention can be more precisely performed. In addition, due to the rateless property of random network coding, the receiver does not have to specify which blocks have errors in the packet, and only needs to ask for an additional number of blocks. As such, the present invention is resilient to time-varying and bursty channel errors, by dynamically adapting to fluctuating channel conditions in realistic networks such as Wi-MAX, especially when mobility is present such as handover.

The present invention may be worked in multi-hop multi-channel wireless networks, such as handover and multi-hop modes in Wi-MAX. In such networks, a mobile node is able to establish connections with two or more upstream nodes through different sub-channels (different subsets of orthogonal subcarriers in OFDMA). Cooperatively, they can use different sets of coefficients to generate coded blocks for the same transmitted packet. As an example shown in FIG. 2, base station 1 generates coded blocks A1, . . . , A5, and base station 2 produces A6, . . . , A10 similarly. The mobile node is able to collect coded blocks from both connections simultaneously without interference and try to decode the packet by combining clean coded blocks. Although there are dirty blocks in each reception. A3 and A5 from base station 1, A7,A9 and A10 from base station 2. Here, the mobile node is still able to reconstruct the packet from errors by collecting sufficient number of clean coded blocks (A1, A2, A4, A6 and A8). Again, due to the rateless property of random network coding, it is not required to use sophisticated channel estimation and allocation mechanisms to dictate where these blocks should come from. In the present invention, clean coded blocks from any of the senders are equally useful. With the present invention, the mobile node is able to perform concurrent multi-path transmissions by dynamically collecting clean coded blocks, which will improve the throughput performance significantly.

In order to distinguish clean symbols from dirty symbols, the present invention use soft decision values provided by physical layer demodulation on each bit received, and estimates the correctness of a symbol after demodulation. For the exemplary purpose only, the IEEE 802.16 Wi-MAX family of standards as a representative of physical layer design in multi-channel wireless networks is being used. However, the present invention may also be applied to other multi-channel wireless networks based on OFDMA and HARQ.

As aforementioned, the present invention is designed specifically to explore the benefits of using network coding at the symbol level in the physical layer of multi-channel wireless networks, with IEEE 802.16. A symbol described in this disclosure may refers to a unit of data that is defined by the modulation scheme in the physical layer. For example, one symbol represents two bits if Quadrature Phase Shift Keying (QPSK) is used, and four bits if 16 Quadrature Amplitude Modulation (16 QAM) is used.

Figure 3:
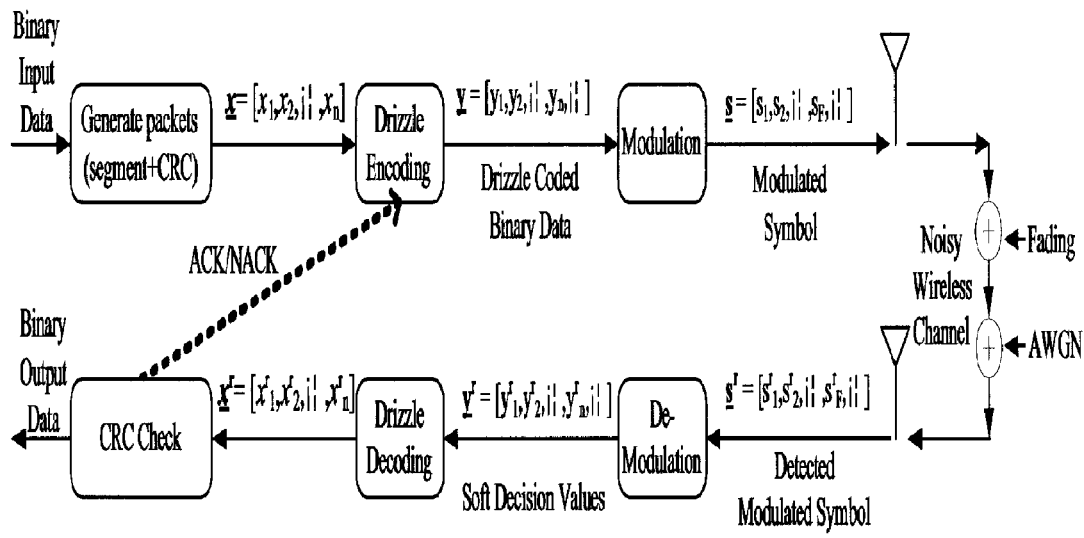
FIG. 3 shows an exemplary block diagram according to the present invention.

FIG. 3 shows an exemplary block diagram according to the present invention, which provides a better understanding of the present invention. First, a transmitter divides an input bit stream into segments and adds cyclic redundancy check (CRC), which is used for error detection at a receiver. Here, the CRC appended segment will be referred as packet. Each packet is then divided into blocks with fixed size ($x=[x_1, x_2, \ldots, x_n]$), each of which containing a certain number of physical layer symbols. It will be easy to compute the number of blocks in one packet if the packet size is pre-determined, and this quantity may be called as the batch size in network coding. Unlike the related art, the present invention does a random network coding upon blocks within the same packet. For example, if n be the batch size, and xi (i=1, 2, . . . , n) be the blocks in the packet, $c_{ji}$ (i=1, 2, . . . , n) be the set of random coefficients generated in a given Galois field, the size of which is determined by the number of bits in a block (e.g., for a block with 8 bits, $GF(2^8)$ would be used). A coded block $y_j$ can then be produced as $$y_j = \sum_{i=1}^{n} c_{ji} \cdot x_i.$$

Each generated coded block can be mapped to one or several modulation symbols. The required number of symbols for one coded block depends on the size of the coded block and the selected modulation scheme. For example, a coded block with a block size of 8 bits is mapped to four symbols for QPSK and two symbols for 16 QAM. The encoder is able to generate a virtually unlimited number of coded blocks $y_j$ (j=1, 2, . . . ) using different sets of coefficients, and any n of these coded blocks can be used to decode by inverting a matrix of coding coefficients. This is usually referred to as the rateless property.

Demodulation in the physical layer on the receiver makes its best decision on the received signals. Due to noise and channel fading, the demodulator may make incorrect decisions, leading to errors. The decoder of the present invention tries to decode the received coded blocks using hints from demodulation, which are referred to as soft decision values. The soft decision values are an estimation of code bit log likelihood ratios (LLRs).

In case of perfect channel knowledge, the estimation of code bit LLR under $2^K$-QAM can be obtained by the following equation:

$$\Lambda(b_k) = \ln \sum_{s^+ \in \{s: c_k=+1\}} \exp\left(-\frac{|y_s - \alpha s^+|^2}{\sigma^2}\right) - \ln \sum_{s^- \in \{s: c_k=-1\}} \exp\left(-\frac{|y_s - \alpha s^-|^2}{\sigma^2}\right)$$

where k is the bit order of used $2^K$-QAM symbol; $y_s$ is the received QAM symbol; $\alpha$ is the channel gain;

$$s(s \in \{s_1, s_2, \ldots, s_{2^K}\}, s=b_1 b_2 \ldots b_K)$$

is the transmitted QAM symbol; $\sigma^2$ is the variance of noise which is complex Gaussian random variable with zero mean.

Therefore, soft decision value represents how much confidence the demodulator has in making the 0-1 decision on each bit. In the present invention, an adaptive error detection algorithm is used to estimate if a block is received in error, using these soft decision values from the demodulation process. With such estimation, the present invention gives priorities to blocks with high confidence that they are correct or clean. It is important to have a sufficient number of clean blocks with high probability, as many as the batch size n, before decoding begins, as dirty blocks will lead to decoding failures which can be verified by checking CRC. When error occurs, the receiver asks the sender(s) to retransmit additional coded blocks, until the entire packet is correctly decoded, or a maximum number of retransmissions are reached.

In the present invention, an adaptive retransmission is used. Each received packets is inspected, and a confidence level of each block i($\neg \chi i$) in the packet is derived using soft decision values from the demodulation process as follows:

$$\chi_i = \frac{\sum_{j=1}^{t} \sum_{k=1}^{K} \Lambda'(b_{jk})}{Q}$$

where Q is the total number of bits in one single block and $\Lambda'(b_{jk})$ is normalized soft decision value of ith bit in jth symbol in the block.

Here, the normalized soft decision values are specially introduced in the present invention to more accurately evaluate the symbol correctness. There are t bits in one symbol and K symbols in one block. Clearly, t×K=Q. Essentially, Eq. 2 shows that the confident level is calculated as the average value of the normalized soft values of all bits in the block.

Figure 4:
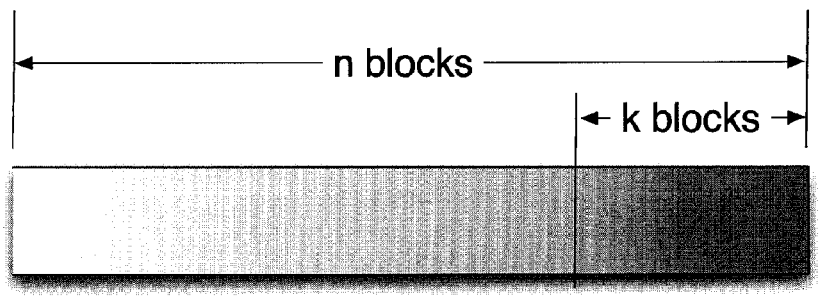
FIG. 4 illustrates a packet blocks applied in the present invention.

The blocks with lower confidence levels have lower priorities in the decoding process. FIG. 4 illustrates a packet blocks applied in the present invention. The receiver constructs a set of blocks to decode, which always includes top n (batch size) blocks with the highest confidence levels, i.e., top n blocks with highest $\chi i$. If the decoding process fails, the receiver tries to exclude blocks with confidence levels below a certain threshold, marked as dirty blocks. In the example of FIG. 4, there are n received coded blocks in total, where k of them are classified as dirty. If decoding fails for the initial transmission, the receiver computes the number of dirty blocks (in this case k), and requests the sender to transmit additional coded blocks via NACK. After receiving k additional blocks from the sender, the receiver has so far received n+k blocks, and again tries to decode the packet with the n (out of n+k) blocks with the highest confidence levels. This process is referred to as adaptive retransmission, since the sender is only called upon to retransmit a sufficient number of additional blocks for the receiver to decode, and if blocks are sufficiently small, the available wireless bandwidth is effectively used.

Figure 5:
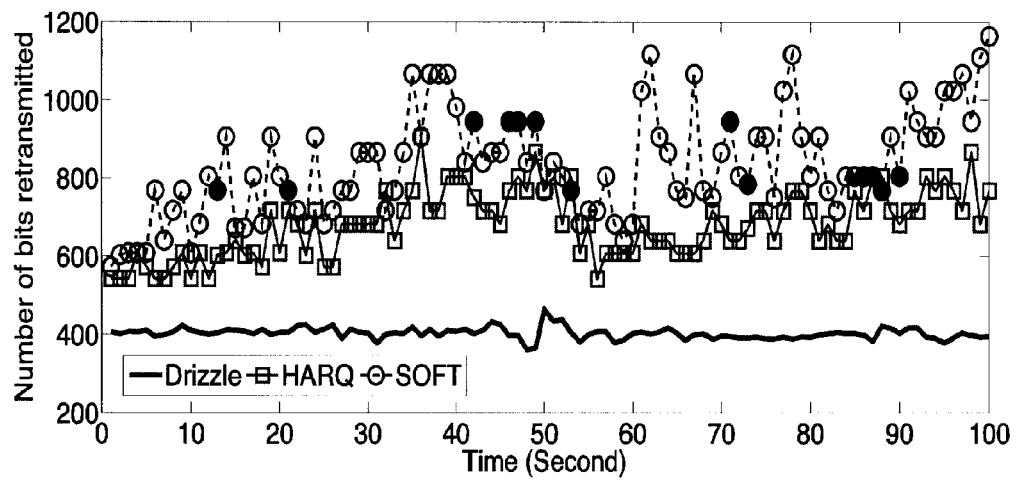
FIG. 5 shows a diagram illustrating an average number of bits retransmitted in a single link transmission by the present invention and the related art.

The receiver needs to identify the set of coded blocks from different packets, since decoding can only be performed with coded blocks from the same packet. For this purpose, a sequence number should be used to uniquely identify a packet. This is usually not an issue in physical layer designs. For example, Wi-MAX employs control channels so called Down Link (DL) Media Access Protocol (MAP) and Up Link (UL) MAP messages, which are allocated periodically at the beginning of the frame. The present invention may use these control channels to deliver the sequence numbers of packets (similar to HARQ). Adaptive retransmission is always performed as the present invention is employed. FIG. 5 shows a diagram illustrating an average number of bits retransmitted in a single link transmission by the present invention and the related art. In this diagram, a Rayleigh fading channel is used to simulate time-varying channel conditions between a sender and a receiver. Specifically, the FIG. 5 shows the number of bits retransmitted for correctly recovering the error packet over a period of time (100 seconds). As illustrated in FIG. 5, the present invention (Drizzle) consistently uses a significantly smaller number of bits in its retransmissions (on average 403 bits for Drizzle, 632 bits for HARQ, 835 bits for SOFT) which result in substantial throughput enhancement, and outperforms both HARQ and SOFT by 36% and 52%, respectively. The intuition is that, the present invention allows the sender to retransmit a barely sufficient number of symbols, rather than blindly retransmitting the redundancy.

In terms of delay performance, the present invention can achieve shorter packet delivery time than HARQ and SOFT since it transmits significantly small number of bits in its retransmissions taking short transmission delay. However, in Wi-MAX, since the receiver has to wait for uplink transmission opportunity to send ACK/NACK feedback to the transmitter, the gain on the transmission delay time reduction is negligible.

In multi-channel wireless networks, such as Wi-MAX, a mobile node may frequently move across the boundary, and migrate from the air interface of one upstream node to that provided by another. In the overlapping region, a mobile node is able to connect to multiple upstream nodes. This is usually referred to as the handover scenario. An illustrative example of handover is already shown in FIG. 2, where a mobile node is in the handover region and communicate with two upstream nodes with separate orthogonal sub-channels concurrently. As an opportunity for multi-path transmission is created in such scenarios, multiple senders are able to cooperatively transmit coded blocks to a receiver.

Figure 6:
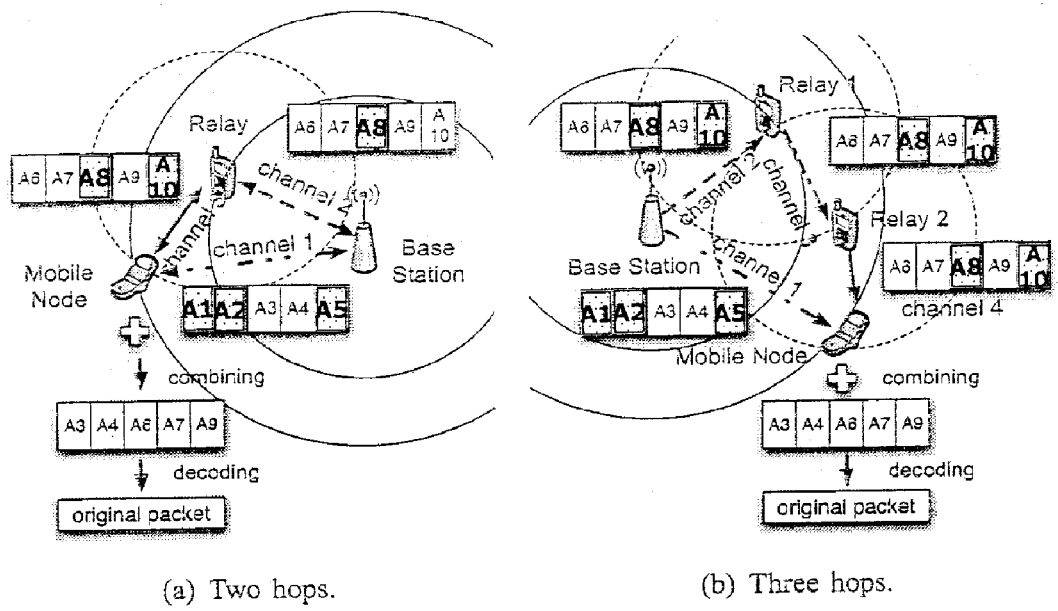
FIG. 6 illustrates a cooperative transmission of coded blocks in multi-hops modes of multi-channel wireless networks.

In addition, the cooperative transmission also works in the multi-hop mode of multi-channel wireless networks when relays are enabled. When the mobile node moves into an overlapped region covered by both an upstream node and a relay, it is able to communicate with both of them simultaneously via different sub-channels. Having more than a single wireless hop, the multi-hop mode also creates an opportunity for multi-path transmission. FIG. 6 illustrates a cooperative transmission of coded blocks in multi-hops modes of multi-channel wireless networks, where a mobile node communicates directly with a base station, and indirectly with the base station via a relay at the same time via a separate path. The present invention aims to take advantage of both random network coding and the convenience of multiple channels, and exploit the benefits of cooperation in multi-path transmission, that leads to the efficient use of available channel bandwidth.

Figure 2:
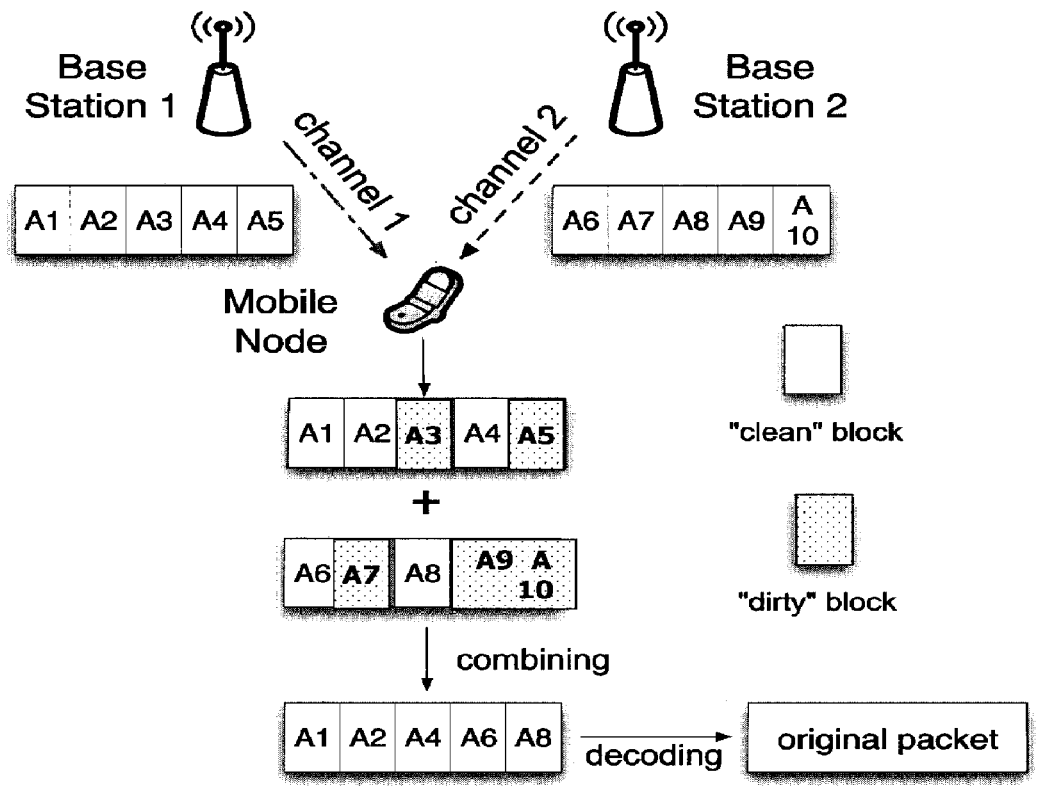
FIG. 2 illustrates a transmission of coded blocks in multipath transmission.

Cooperative transmission is specially designed for the present invention to realize the potential benefits in multi-path transmission. The intuition in handover scenario is shown in FIG. 2 where the base stations send different coded blocks, while the mobile node collects all useful data simultaneously. Due to the channel diversity and fine error control granularity in symbol level, the mobile node is able to get sufficient number of clean blocks faster which will improve the throughput performance. Such cooperative transmission could also be performed at the uplink, where the mobile node is responsible to generate distinct coded blocks, and the access gateway performs the decoding process.

Cooperative transmission also works well in the multi-hop mode of multi-channel wireless networks. In multi-hop transmission scenarios, the sender, receiver and relay are connected to one another via different sub-channels, where transmissions suffer little from interference. In this case, cooperative transmission can be performed in multi-hop mode in a similar manner as in the handover scenario. As the example shown in FIG. 6(a), the base station serves as the sender by issuing A1, ..., A5 directly to the mobile node and A6, ..., A10 to the relay, which will forward the data to the mobile node. By collecting the data from both paths concurrently, the mobile node tries to recover the original packet by decoding the clean coded blocks it receives.

One issue that the present invention may be concerned with is the amount of data each sender pushes to the receiver. It is noted that different channels experience different qualities, and sometimes the difference is quite significant. The present invention should take advantage of the channel diversity and efficiently transmit the data. Intuitively, in the present invention, it is possible to ask senders with higher channel qualities to transmit more data, which is more reliable and efficient. Assume that the channel Signal to Noise Ratio (SNR) is perfectly estimated on each channel, denoted as SNR1, ..., SNRq as there are a total of q senders serving the same receiver. The number of coded blocks that need to be transmitted is denoted as $N_R$ (normally $N_R$ is the same value as the batch size n). The number of coded blocks transmitted by each sender (denoted as N1,N2, ..., Nq) is computed as follows:

$$\frac{N_1}{SNR_1} = \frac{N_2}{SNR_2} = \ldots = \frac{N_q}{SNR_q}$$

$$N_R = \sum_{i=1}^{q} N_i$$

Figure 7:
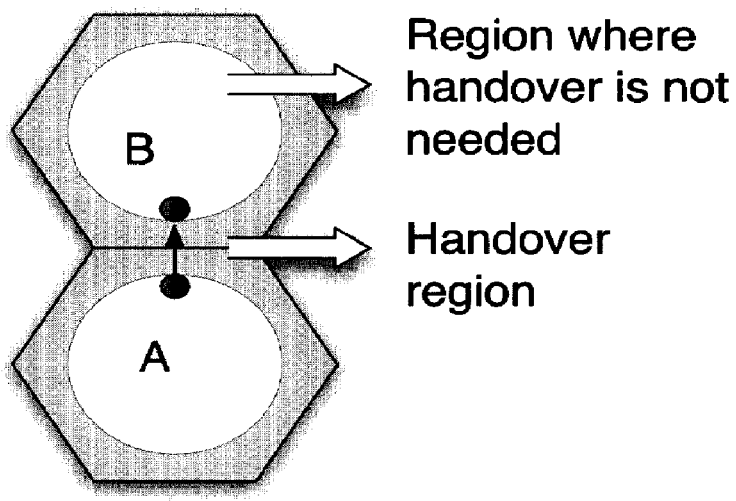
FIG. 7 illustrates a Wi-MAX handover event when a terminal moves across the handover region with a constant speed.
Figure 8:
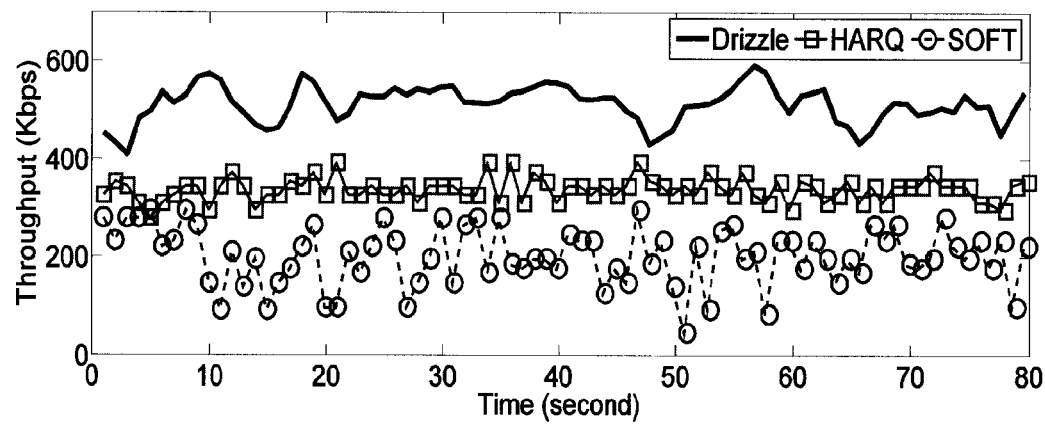
FIG. 8 shows a diagram illustrating a throughput performance of the present invention over time in the handover situation.
Figure 8:
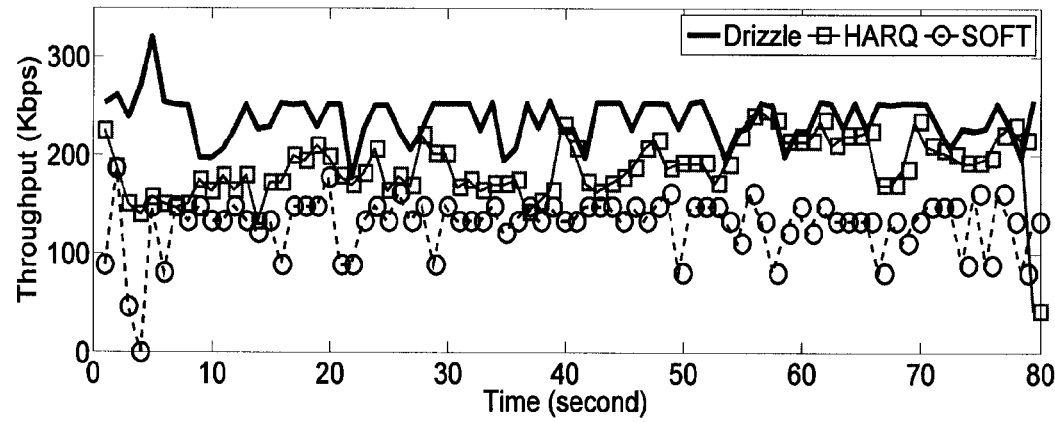

FIG. 7 illustrates a Wi-MAX handover event when a terminal moves across the handover region with a constant speed and FIG. 8 shows a diagram illustrating a throughput performance of the present invention against both HART and SOFT over time in the handover situation. As depicted in FIG. 8, the present invention (Drizzle) outperforms both HARQ and SOFT. On the downlink, the present invention has an average throughput gain over HARQ and SOFT by 52% and 154% respectively.

Soft decision values conveyed from the demodulation process in the physical layer is used in the present invention to detect errors in a coded block. Current modulation schemes in the physical layer compute the soft decision values on their 0-1 decision on each bit. Soft decision values (SV) show the confidence of demodulation, when making such a decision. A bit with a negative SV is translated into 1, whereas a bit with a positive SV is translated into 0 when making the decision. A larger absolute value in the SVs indicates a higher level of confidence on the decision being made. Unfortunately, the distribution of SV varies depending on modulation schemes and channel conditions.

Figure 9:
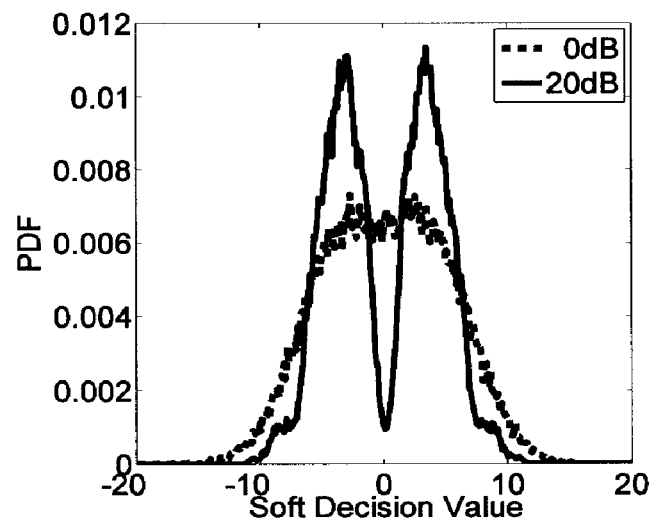
FIG. 9 shows a diagram illustrating a distribution of soft decision values under BPSK modulation.
Figure 9:
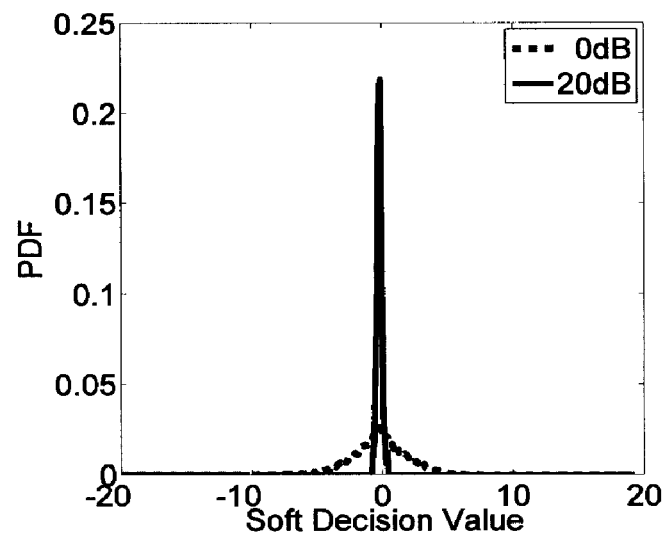

FIG. 9 shows a diagram illustrating a distribution of soft decision values under BPSK modulation. In FIG. 9, for exemplary purpose only, a packet of 25K bytes is transmitted over Rayleigh fading channels with a 30 km/h moving speed, and under different channel conditions. As depicted in FIG. 9, the SV distribution is different as the channel quality changes. For example, if a bit of which SV is −5 under a SNR of 0 dB is received, there is still some probability that this bit has an error according to the SV distribution for error bits. However, the bit with SV of −5 is 100% clean under a SNR of 20 dB. Also, different modulation schemes generate different SV distributions. Thus, it is not accurate to quantitatively measure the confidence levels without considering the impact of channel conditions and modulation schemes. Intuitively, normalizing the soft decision values by considering different signal qualities and modulation schemes is a good solution to this problem. In the present invention, soft decision values are normalized with the following formula before use:

$$NSV(s, SNR, M) = \frac{s}{|s|} \int_{-|s|}^{|s|} d(s, SNR, M) ds$$

where NSV denotes the normalized SV, d(s,SNR,M) denotes the probability density function (PDF) for SV under a certain SNR and modulation (M), and s denotes the SV variable. For example, NSV (−10, 0 dB, BPSK) is −96.3%. The normalized SV is essentially the cumulative fraction of the absolute SV, since the SV distribution is symmetric with respect to 0. After normalization, the range of SV resides in [−1, 1]. It is straightforward that larger absolute values of the normalized SV indicate higher confidence levels on the correctness of demodulation. SV distributions under different channel qualities and modulation schemes are obtained from a large number of simulations. Normalized SVs are able to reflect relative characteristics of SVs, as they are tightly integrated with fluctuating channels and the adaptive modulation scheme adopted in the physical layer of multi-channel wireless networks.

In the present invention, soft decision values have two main functions. First, they are used to construct the set of coded blocks used for decoding. To determine the confidence level of a coded block, the present invention uses the absolute value of the normalized SV of each bit, and then computes the average of all bits in the coded block. A smaller average represents a lower confidence level that the block is correct, whereas a larger average shows a higher confidence level. As it has been shown in this disclosure, blocks with higher confidence levels will be given higher priorities to be included in the set of blocks for decoding.

Unfortunately, confidence levels of coded blocks directly computed from the average may not be sufficiently accurate, since very often there exists a large variance on the absolute SVs of bits within the block (a block contains a small number of bits). A few bits with low absolute SVs may not be effective reducing the confidence level of the entire block, provided that there are much higher absolute SVs on some of the bits in the block. As such, it is necessary to penalize the block with one or a few dirty bits with low absolute SVs, otherwise the existence of even one block that is not correctly received will contaminate the entire decoding process.

In the present invention, the SVs for all bits in a block should be checked. If any of the bits has an absolute SV that is below a certain threshold, the confidence level of this block is set to the absolute SV with the lowest value. In this way, priorities of blocks with just a few error bits will be reduced, which provides a more accurate measure with respect to the confidence level of a coded block.

It is noted that this threshold (referred to as SV-threshold) should be carefully selected. If a threshold that is too aggressive (overly high) is used, priorities of clean blocks would be incorrectly reduced. On the other hand, if a value that is too low is used, it would not be sufficiently powerful to detect blocks that are received in error.

Figure 10:
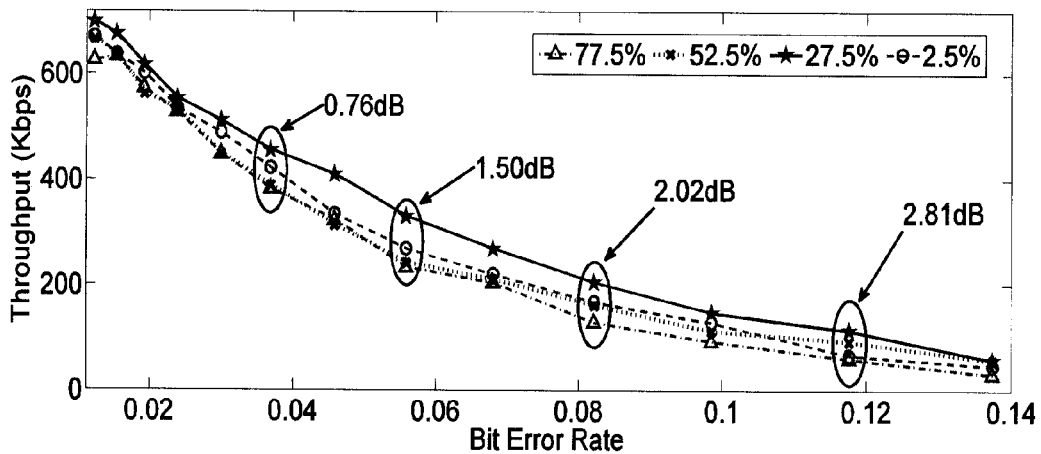
FIG. 10 shows a diagram illustrating that selecting different SV-thresholds affects the performance of the present invention.

FIG. 10 shows the performance of the present invention for different SV-thresholds under different bit error rates of the wireless channel. For exemplary purpose only, 4 different SV-thresholds are used to check how it affects the performance. As illustrated in FIG. 10, the selection of SV-threshold indeed affects the performance. As shown in the FIG. 10, choosing a threshold as 27.5% gives the best performance among the four choices. When higher thresholds are used (such as 52.5%, or 77.5%), the throughput is reduced, which indicates that overly aggressive screening may incorrectly reduce the priorities of clean blocks. On the other hand, it is noted that a threshold that is too low (such as 2.5%) also negatively affects throughput performance, as dirty blocks remain in the set to be decoded. Therefore, the SV-threshold should be tuned carefully.

The second function of soft decision values in the present invention is to count the number of dirty blocks in the set of blocks used for decoding. When the decoding fails after each transmission, the receiver will count the number of dirty blocks in the decoding set, and ask the sender to transmit the same number of additional coded blocks. This number will determine the number of blocks retransmitted, and will directly affect the performance of the present invention. As such, a threshold must be set in the present invention (referred to as level-threshold), so that blocks with a confidence level that is lower than this threshold will be counted as a dirty block. The present invention is designed to be able to adjust the level-threshold depending on specific requirements of the application.

Figure 11:
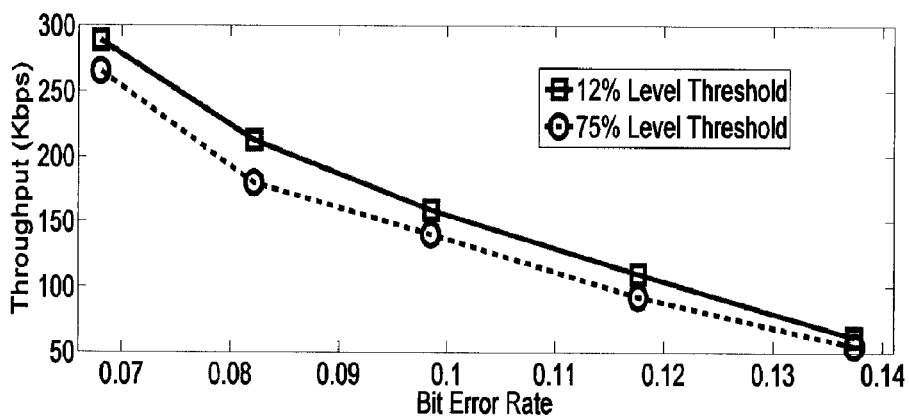
FIG. 11 shows a diagram illustrating that level threshold affects the tradeoff between delay and throughput performance in the present invention.
Figure 11:
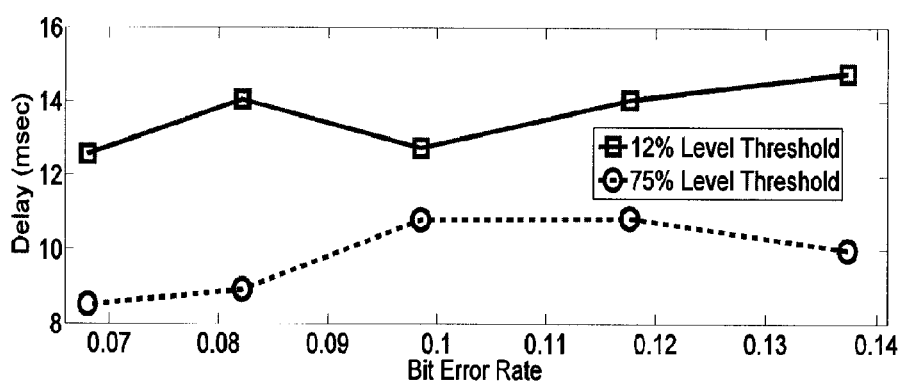

If the application is delay sensitive (such as voice), the level-threshold should be set to be high in order to conservatively request more coded blocks at the next transmission. Otherwise, if the application requires higher throughput, the level-threshold could be set to be lower, to request barely sufficient number of additional coded blocks, so that available bandwidth can be most efficiently used. FIG. 11 shows the delay and throughput tradeoff of two different level-thresholds. Level-thresholds of 12% and 75% are used in FIG. 11. Whereas a level-threshold of 12% shows 14% better throughput performance on average, a level-threshold of 75% is 39% better with respect to delay (on average).

By applying normalized SV and adaptive threshold described above, the present invention is able to check the correctness of each coded block. It collects no matter where the block comes from and which modulation scheme is used on it. The Normalized SV and adaptive threshold techniques in the present invention are essentially a way to perform link adaptation by tightly integrating with the adaptive modulation scheme adopted in the physical layer of multi-channel wireless networks. In the multi-path transmissions, different senders may use different modulation schemes to transmit coded blocks to the same receiver, as channel conditions are different on each path (adaptive modulation is applied). However, the receiver could check the correctness of all the blocks effectively by applying normalized SV and adaptive threshold. The present invention makes it possible for the receiver to correctly select clean blocks and decode the original packet successfully.

Figure 12:
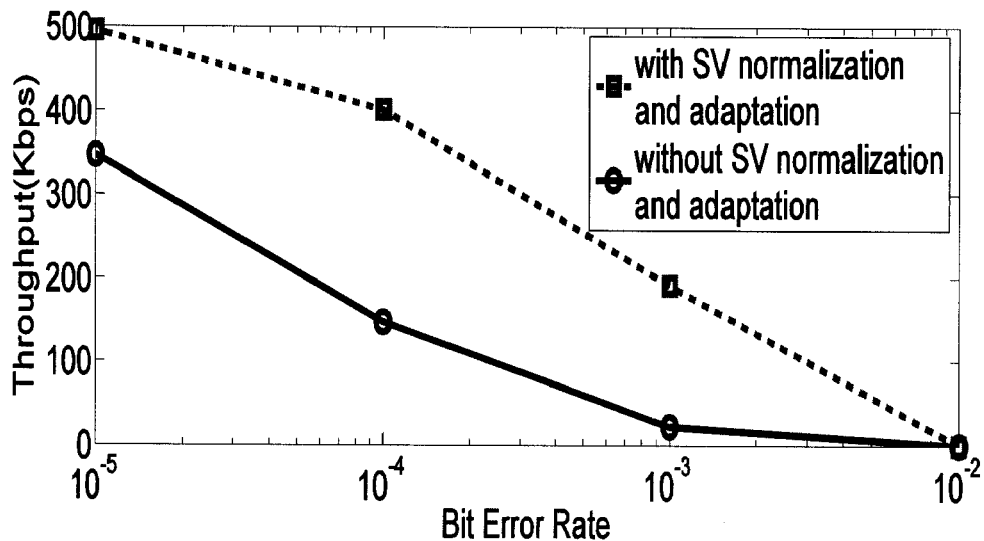
FIG. 12 shows a diagram illustrating that a comparison of performance of the present invention with and without SV normalization and adaptation in a cooperative transmission scenario.

FIG. 12 shows a diagram illustrating that a comparison of performance of the present invention with and without SV normalization and adaptation in a cooperative transmission scenario, where a 3.24 dB gain can be achieved on average by applying normalized SV and adaptive threshold. This shows significant benefits from the link adaptation. In the FIG. 12, two upstream nodes serve as the sender and transmit data to the same receiver via two separate sub-channels, and QPSK and 16 QAM are used on each path respectively. By applying adaptive modulation, the modulation schemes are determined to meet the target Bit Error Rate (BER) based on the estimated SNR. For example, if the target BER is 10.3, 16 QAM is used at a SNR of 8 dB and 64 QAM is used at a SNR of 12 dB.

As aforementioned, each packet is divided into a number of blocks, on which random network coding is performed. It may appear that a smaller block is always preferable, as a smaller block lead to less overhead when retransmissions are made as a multiple of blocks, and more accurate confidence levels as the normalized SVs of bits are averaged. Unfortunately, a block that is too small will lead to an inherent problem that is hard to address. A block with m bits uses $GF(2^m)$ to perform random network coding, and a smaller number of bits in a block leads to a smaller size of the Galois Field, with a smaller degree of freedom when coefficient vectors are randomly chosen. This leads to a higher probability of producing linearly dependent blocks with random network coding. It is therefore important to choose an appropriate size for the coded block, so that the block is sufficiently small, but there is still sufficient degrees of freedom to produce randomized coefficient vectors that are linearly independent of one another.

Figure 13:
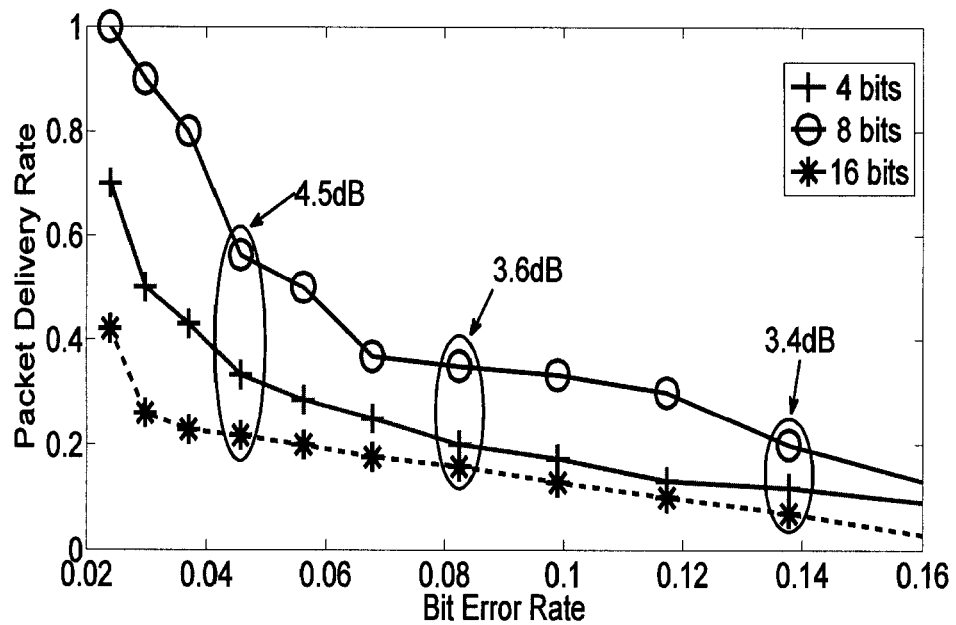
FIG. 13 shows a diagram illustrating that a proper block size selection impacts a performance of the present invention.

FIG. 13 shows a diagram illustrating that a proper block size selection impacts a performance of the present invention. In FIG. 13, it is assumed that a large file is transmitted from a sender to a receiver in a single link under Rayleign fading channel and the packet deliver rate, which is a ratio of the number of error free packets to total transmitted packets, is examined at the receiver. From the results as shown in FIG. 13, it is noted that the best choice is 8 bits. There is performance degradation by either choosing over small size (4 bits) or over large size (16 bits). Thus, this disclosure proposes to use $GF(2^8)$ to perform random network coding. In this case, a block may contain more than one symbol, if a symbol contains fewer than 8 bits.

In the present invention, it is important to reduce the overhead of communicating random coefficients from the sender to the receiver for each coded block. Since the size of the block is small, the number of blocks in a packet will be large (64 blocks in a 512-bit packet, for example), with a large number of corresponding coefficients. Regardless of how these coefficients are carried, the overhead over the wireless channels will be prohibitive. The solution is to not explicitly communicate coefficients to the receiver at all. Instead, the random coefficient matrix can be pre-generated and kept at both the sender and the receiver. In Wi-MAX, the sender and the receiver need to negotiate parameters such as modulation, coding, and transmission power, before starting to transmit actual data packets. In the present invention, the sender transmits the index of the pre-generated random coefficients matrix that is used for encoding to the receiver, as a part of the session control information. Upon receiving such an index, the receiver has full knowledge of all coefficient vectors used in future coded blocks from the sender, by looking up the pre-generated matrix. When multiple senders are engaged in cooperative transmission, a different coefficient matrix should be used for each sender. It is also possible to use a seed of a pseudo-random number generator instead of the index to specify a future sequence of coefficient vectors to be used by a sender.

As neither base stations nor relay stations have constraints with respect to energy and computational power, the computation overhead at mobile stations should be only concerned. Nowadays, the power of handsets is developing fast. Even a mobile device, nowadays, like cell phones have much memory cache and strong computing ability. According to the results from the present invention, random network coding is almost free with the current processors. According to the present invention, the coding speed could reach 1248 Mbps for 16 blocks of 32 KB each and 348 Mbps for 64 blocks of 32 KB each. As a block size is as small as a few bits, the encoding and decoding are even much faster. Although it indeed adds computation overhead in some degree, it keeps the overhead within practical limits. In fact, the present invention (Drizzle) has much smaller overhead compared with previous work. Specifically, the present invention adopts a totally different approach by using predefined code book which is only pre-transmitted to the receivers once through reliable channels. There is no header overhead totally. Further, the feedback information used in the present invention are transmitted via separate channels (control channels). Thus, the feedback messages are transmitted parallel with the data, which do not generate any delay at all.

Figure 14:
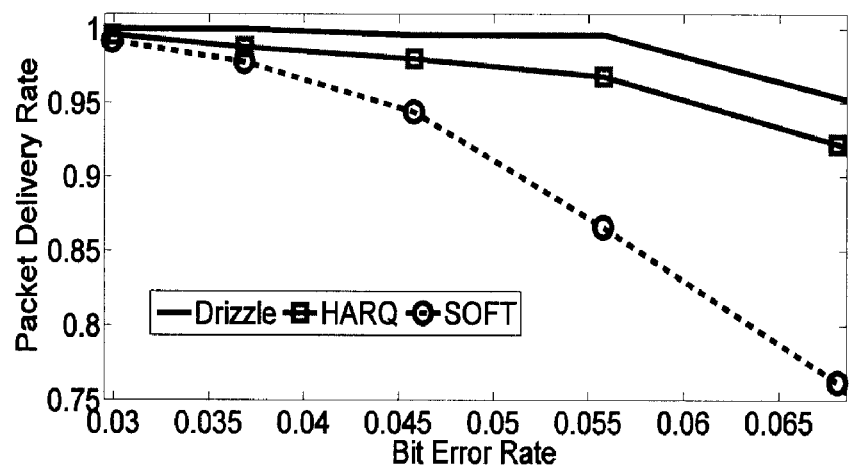
FIG. 14 shows a diagram illustrating a packet delivery rate and throughput with a range of BERs.
Figure 14:
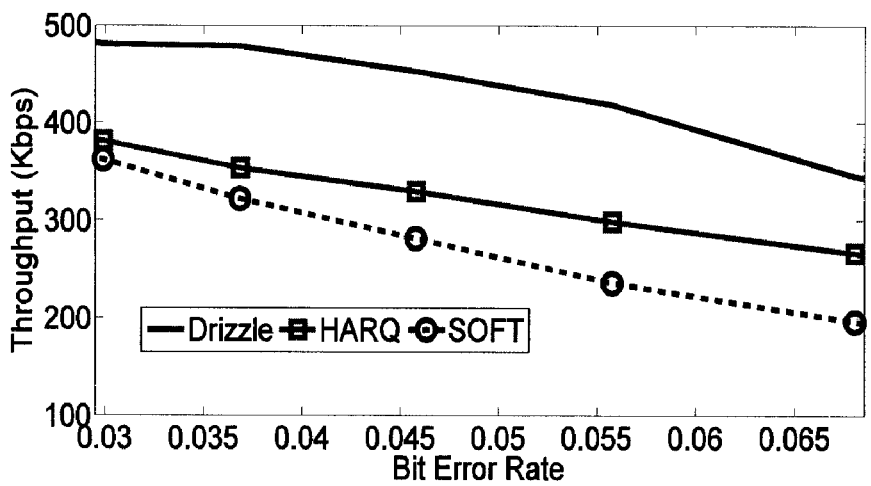

FIG. 14 shows a performance comparison among the present invention (Drizzle) and the related art (HARQ and SOFT) under various BERs. The performance with respect to packet delivery rates is shown in FIG. 14(a), and FIG. 14(b) shows the corresponding throughput for all three protocols. As it can seen from the results of the FIG. 14, it could be easily observed that the present invention's packet delivery rate (average: 0.93) is higher than both HARQ (average: 0.90) and SOFT (average: 0.80) by 3% and 16% respectively. The performance gain becomes more substantial when throughput is considered. The present invention outperforms HARQ and SOFT by 24.5% and 45.7%, respectively. This is because Drizzle is designed to tightly integrate with the adaptive modulation scheme in the Wi-MAX physical layer. These improvements are supported by the efficient use of the available wireless bandwidth, due to adaptive retransmissions in the present invention.

Figure 15:
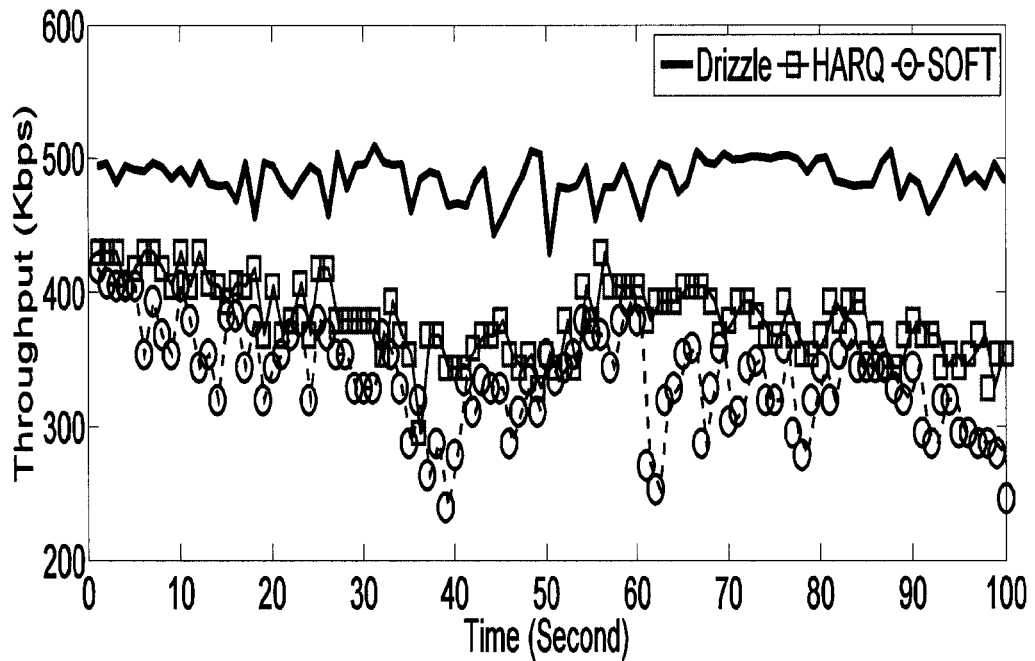
FIG. 15 shows a diagram illustrating a throughput in a single and time-varying wireless link when a terminal (UE) is in a mobility situation.

FIG. 15 shows the downlink throughput performance of all three protocols in a single and time-varying wireless link when a terminal (UE, MS) is in a mobility situation. As it can seen from the results of the FIG. 15, it could be easily observed that the present invention's throughput (average: 485.95 Kbps) performs substantially better than both HARQ (average: 381.27 Kbps) and SOFT (average: 336.95 Kbps). This shows the present invention's ability to adaptively match its transmissions to the available bandwidth in time-varying channels, which helps in maintaining higher throughput.

Figure 16:
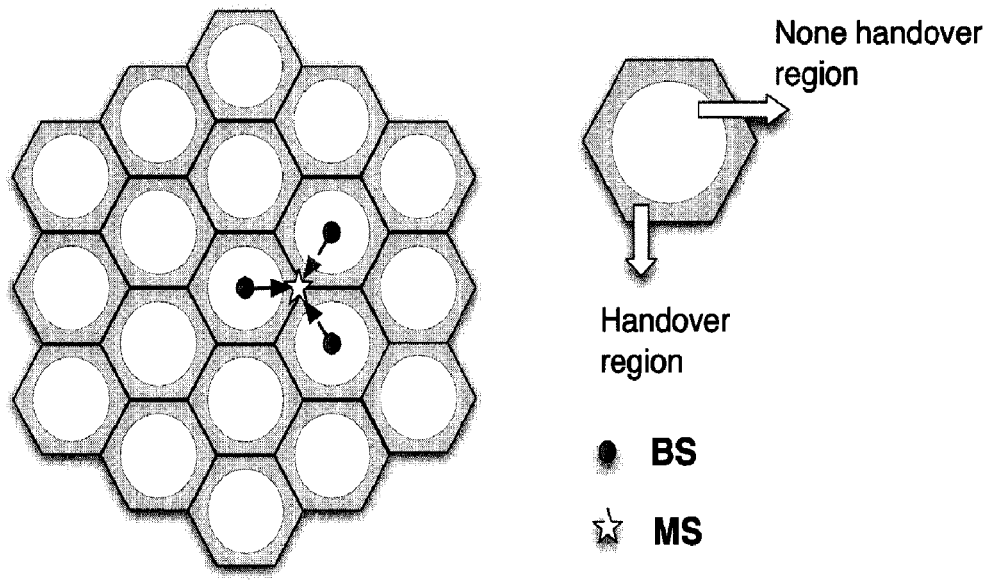
FIG. 16 shows a diagram illustrating a setup in a Wi-MAX handover scenario.

Next, it should be need to identify a potential performance gain offered by cooperative transmissions in the present invention in the Wi-MAX handover scenario, as compared to HARQ and SOFT. Here, the cell sites are laid out as shown in FIG. 16, in which the terminal (MS) is allowed to move around in the service area as the same fashion in the single-link case. At the handover region, the terminal is able to enjoy the multi-path communication and perform cooperative transmission.

Figure 17:
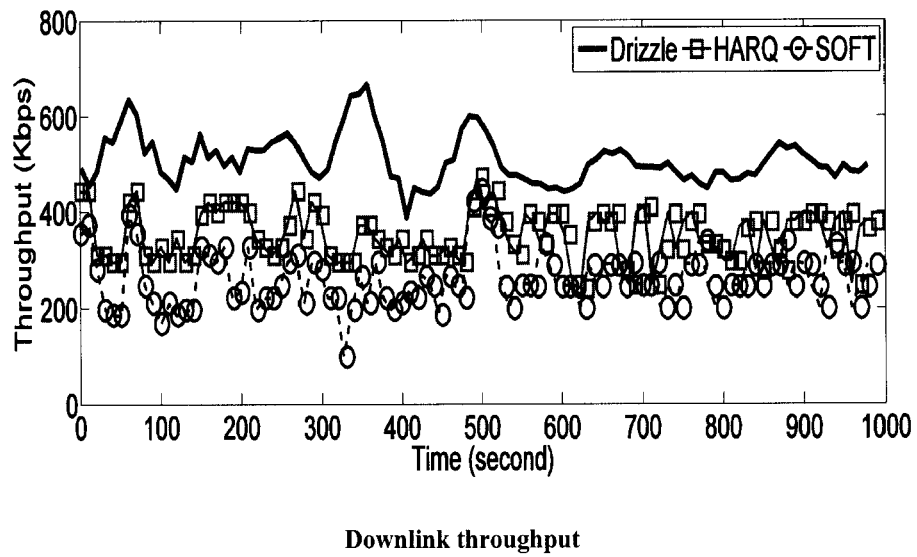
FIG. 17 shows a diagram illustrating a throughput comparison in the Wi-MAX handover scenario.
Figure 17:
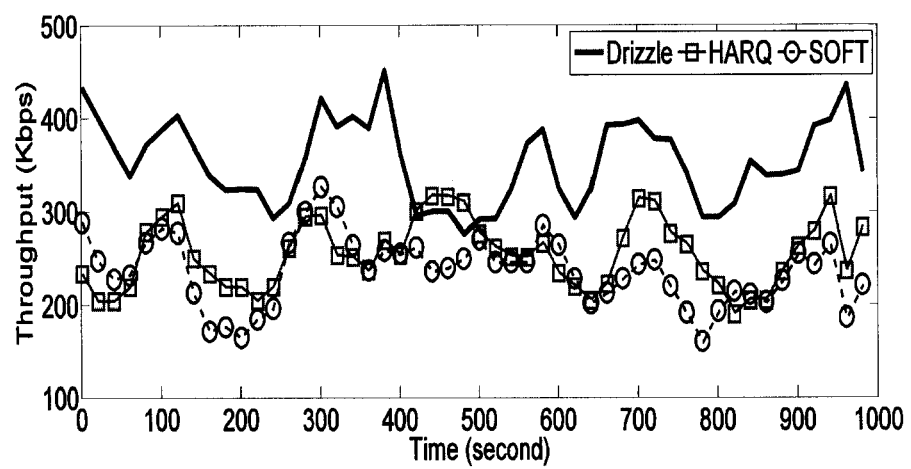

FIG. 17 shows a diagram illustrating a throughput comparison in the Wi-MAX handover scenario. As it can seen from the results of the FIG. 17, it could be easily observed that the average throughput results of the present invention are 505 Kbps (downlink) and 352 Kbps (uplink), and 351 Kbps (downlink) and 303 Kbps (uplink) for HARQ, 259 Kbps (downlink) and 237 Kbps (uplink) for SOFT. In this scenario, the improvement with the present invention reaches 44% and 95% over HARQ and SOFT, respectively, on downlink transmissions. At the same time, the present invention outperforms HARQ and SOFT by 38% and 50% on the uplink. Such a throughput advantage should be considered substantial by any standard.

Figure 18:
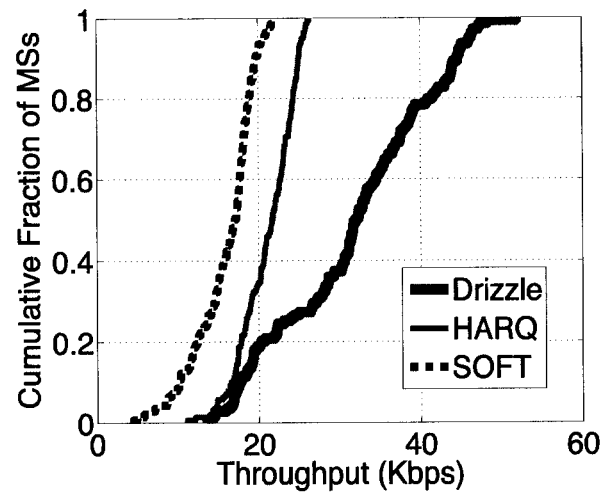
FIG. 18 shows a diagram illustrating a throughput performance in a large-scale handover scenario.
Figure 18:
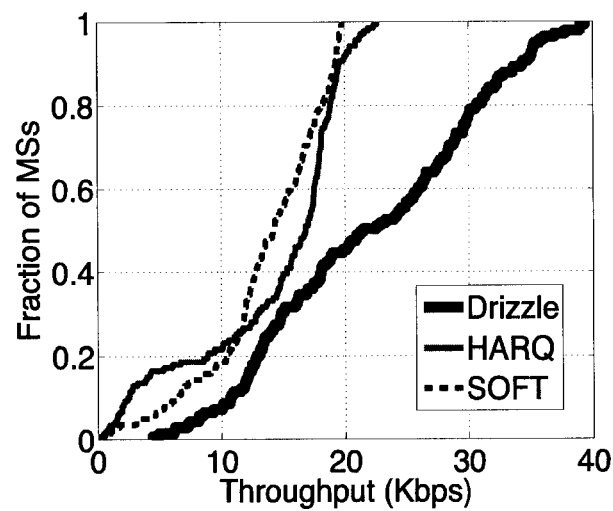

With the objective of becoming even more realistic, the present invention should be extended to a large scale scenario. FIG. 18 shows a diagram illustrating a throughput performance in a large-scale handover scenario. As it can seen from the results of the FIG. 18, it could be easily observed that the present invention outperforms HARQ and SOFT by 50% and 100% respectively on the downlink with respect to the average throughput, due to its effective use of bandwidth and the advantages of random network coding in cooperative transmission. Further, the present invention beats HARQ and SOFT by 56% and 62% respectively on uplink transmissions.

Figure 19:
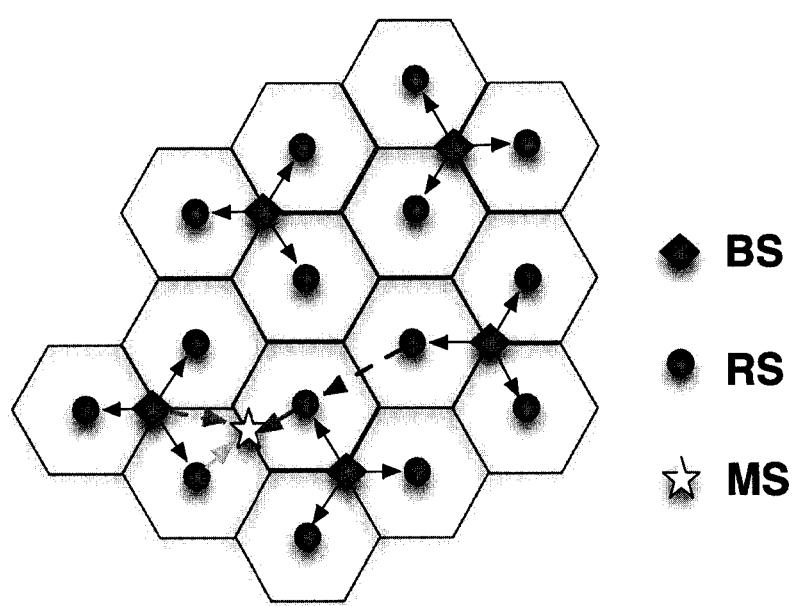
FIG. 19 shows a diagram illustrating a setup in a Wi-MAX multi-hop scenario.

In order to extend the coverage area of a cell, relay stations (RSs) are placed within the border of the radio ranges of BSs. FIG. 19 shows a diagram illustrating a setup in a Wi-MAX multi-hop scenario, where a relatively large multi-hop network is considered. As illustrated in FIG. 19, the MS could communicate either directly with BS, or indirectly with BS through multiple hops connected by RS.

Figure 20:
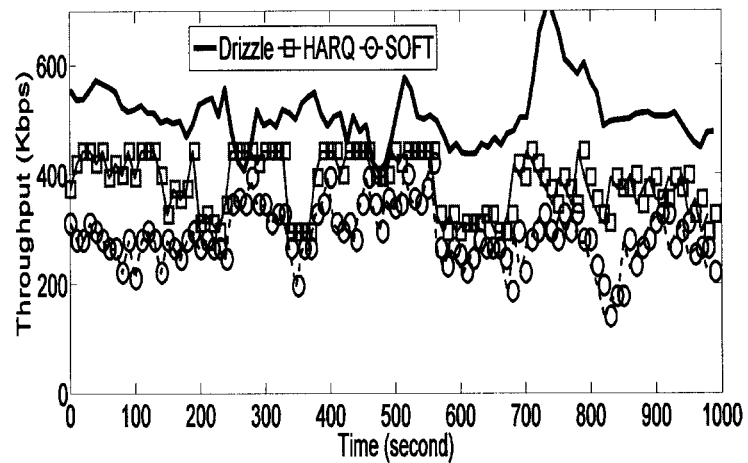
FIG. 20 shows a diagram illustrating a throughput in a realistic multi-hop case.
Figure 20:
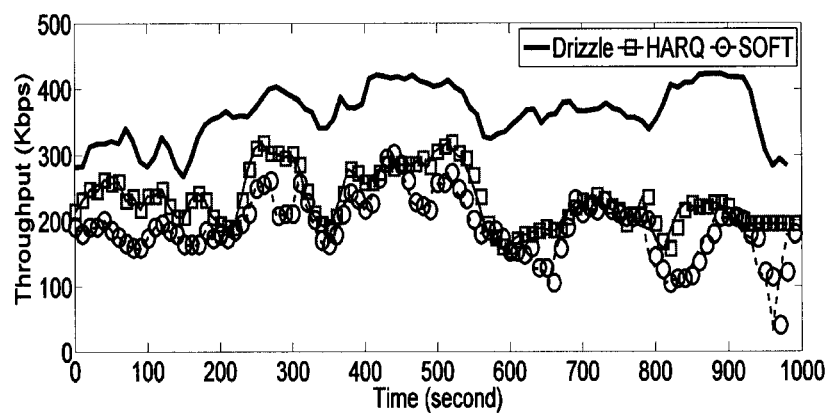

FIG. 20 shows a diagram illustrating a throughput in a realistic multi-hop case. As it can seen from the results of the FIG. 20, it could be easily observed that the present invention obtains 32% and 77% average throughput improvement over HARQ and SOFT respectively on the downlink. Further, the performance gains of the present invention reach to 56% and 85% on the uplink. This demonstrates the ability of the present invention to fully utilize available wireless spectrum in the multi-hop case.

Figure 21:
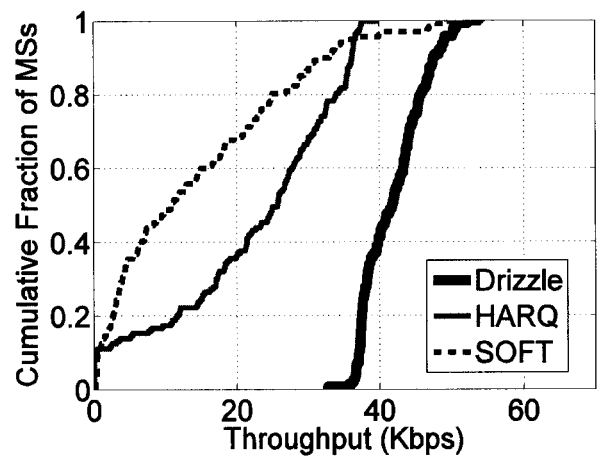
FIG. 21 shows a diagram illustrating a throughput performance in a large-scale multi-hop scenario.
Figure 21:
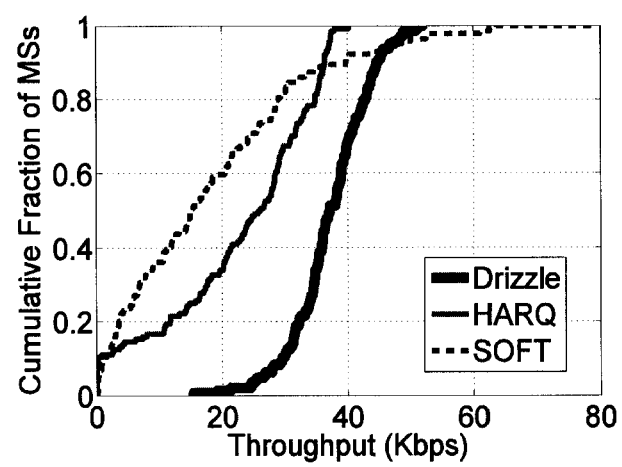

FIG. 21 shows a diagram illustrating a throughput performance in a large-scale multi-hop scenario. As it can seen from the results of the FIG. 21, it could be easily observed that the present invention achieves a 80% higher throughput on average over HARQ, as well as a 1.8 times more gain over SOFT in the downlink. Further, the present invention performs better than HARQ and SOFT by 62% and 100%, respectively, in uplink transmissions. This confirms and highlights the benefits achieved by the present invention in the multi-hop scenario as well.

In this disclosure, the present invention proposes a use of network coding in the physical layer of multi-channel wireless networks. Namely, when network coding is used at the symbol level, the present invention (Drizzle) is able to outperform even HARQ, which is highly optimized in existing physical layer designs (such as Wi-MAX).

Further, the present invention proposes an efficient packet transmission framework by applying a novel scattered random network coding scheme. Different from the traditional employment of random network coding, the novel scattered random network coding scheme classifies the coded blocks into different classes. The bits of blocks will be rearranged where the blocks that is intend to protect will be scattered into good bit positions and other blocks will be put into the bad bit positions. This bit rearrangement is performed over each hop in the same way. Thus, the error rate of protected blocks is decreased significantly. Due to the rateless properties of random network coding, those protected blocks are useful for the packet transmission and helpful to increase the overall packet delivery rate. The intuition is to separate errors: protect certain data and prevent them getting dirty when traveling over multiple hops, so that not all packets are all corrupted as in the traditional scheme. These protected packets will make key contribution to the overall packet transmission.

The random network code encoder divides each packet into blocks with a fixed size. Let us denote n as the number of blocks in a single packet, xi (i=1, 2, . . . , n) as blocks in the packet, and $c_{ji}$ (i=1, 2, . . . , n) as the set of random coefficients generated in a given Galois field, the size of which is determined by the number of bits in a block (e.g. for a block with 8 bits, $GF(2^8)$ would be used). A coded block yj can then be produced as $$y_j = \sum_{i=1}^{n} c_{ji} \cdot x_i.$$

Each coded block is essentially a linear combination of all or a subset of the original data blocks. In this way, the encoder is able to generate a virtually unlimited number of coded blocks $y_j$ (j=1, 2, . . . ) using different sets of coefficients which are independent of one another, and any n of independent coded blocks can be used to decode by inverting a matrix of coding coefficients. This is usually referred to as the rateless property.

In order to reduce the overhead of communicating random coefficients between the sender and the receiver for each coded block, the random coefficient matrix can be pre-generated and kept at the sender, the receiver, and the relays. In the proposed scheme, it is assumes that the sender transmits the index of the pre-generated random coefficients matrix that are used for encoding to the relays and receiver, as a part of the session control information before starting to transmit actual data packets. A soft decision value from the demodulator in the physical layer on the receiver is used for error detection. Using the average soft decision values of coded blocks, the receiver constructs a set of blocks to decode from all the received coded blocks, which always include top n blocks with the highest average soft decision value.

In general, the encoding of a block with m bits requires coefficients drawn from $GF(2^s)$. In order to guarantee a successful decoding, any n×n sub-matrix of the coefficient matrix A should be nonsingular. The following theorem introduces a method to guarantee this property.

Theorem 1: The coefficient matrix A defined as:

$$A=[V'(v, k, n)]$$

guarantees the non-singularity of any n of its rows if the elements of $v=[v_1, v_2, \ldots, v_2 s_{-2}]$ (where $2^s-2>k>n$) are distinct elements of $GF(2^s)$ except 1. V'(v, x, y) is the Vandermonde matrix built up of vector v without the all one's column:

$$V(v, x, y) = \begin{pmatrix} v_1 & v_1^2 & \cdots & v_1^y \\ v_2 & v_2^2 & \cdots & v_2^y \\ \vdots & \vdots & \vdots & \vdots \\ v_x & v_x^2 & \cdots & v_y^y \end{pmatrix}$$

Figure 22:
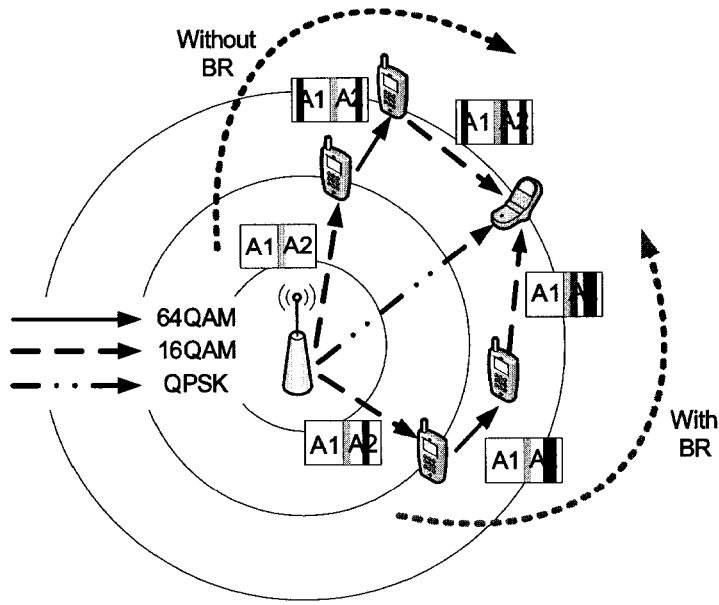
FIG. 22 shows a diagram illustrating that not all the bits are in error in one corrupted blocks.

In general, errors expend over multiple hops in wireless networks, and most likely incur on certain bit positions in the symbols under certain modulation schemes. Under such scenario, the receiver may not be able to collect enough symbols for decoding, even after the retransmissions are performed for several times. Intuitively, it should be proposed to take advantage of the diverse error rate over different bit positions to protect certain coded blocks by arranging bits of the blocks on the good bit positions (with lower error probabilities), so that not all coded blocks are corrupted over multiple hops. An illustrative example is shown in FIG. 22. When BR is applied, the base station puts the bits of block A1 to good bit positions and the bits of block A2 to bad bit positions (with higher error probabilities). By traveling via two hops (through Relay 1 and Relay 2), A1 is correctly received by the mobile node while A2 is corrupted (the darkness indicates the error bits in the blocks). From the FIG. 22, it should note that more and more bits in A2 are corrupted in multi-hop transmissions, since the bits of A2 are scattered on bad bit positions which would lead to errors with higher probability. However, A1 is protected and error free since the bits reside on good bit positions. When such error separation is not applied, A1 and A2 may be both in error (two blocks are with the same error rate). Thus, BR is potentially helpful to improve the throughput performance in multi-hop transmissions by facilitating the receivers to get more clean coded blocks.

All the bits are transmitted in symbols at the physical layers. One symbol contains several bits. For example, there are 4 bits using 16 QAM modulation, and 6 bits with 64 QAM modulation. In BR, the present invention proposes to scatter the bits of coded blocks according to the bit error probabilities on different positions. The coded blocks are divided into two groups: protected and vulnerable. For the transmission on each hop, the present invention proposes to put the bits of protected blocks to good bit positions and vulnerable bits to bad bit positions.

Figure 23:
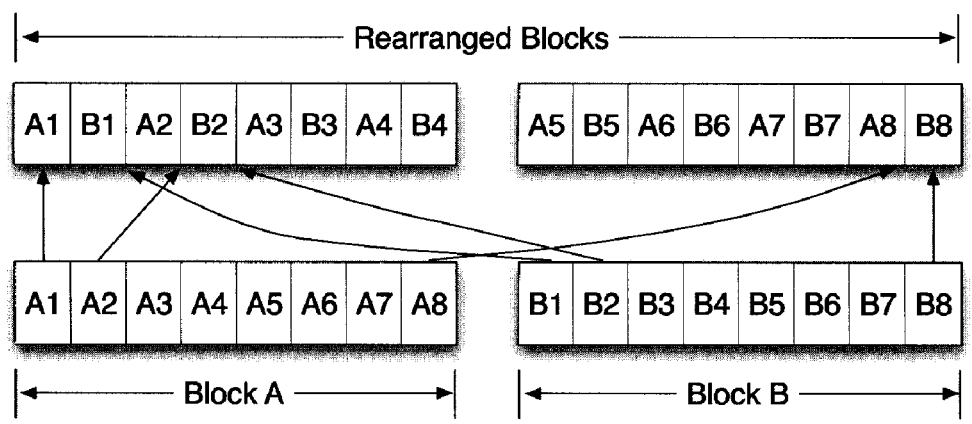
FIG. 23 shows a diagram illustrating a bit rearrangement for blocks under 16 QAM modulation.

FIG. 23 shows a diagram illustrating a bit rearrangement for blocks under 16 QAM modulation. The sender scatters all the bits of block A to the positions with lower error probabilities under 16 QAM (odd numbered bit positions), and the bits of block B to the positions with higher error probabilities (even numbered bit positions).

Without loss of generality, a 16 QAM is used to show how BR helps to lower the block error rate. Assume two coded blocks, each of which consists of s bits, are transmitted over K hops. If BR scheme is not used, the block error rates of the both blocks (denoted as $P_A$ and $P_B$) after K-hop traveling are:

$$P_A = P_B = 1 - (1 - P_{16}(1))^{\frac{s}{2} \times K}(1 - P_{16}(2))^{\frac{s}{2} \times K}$$

When BR is employed, the block error rates of the two blocks (denoted as $P'_A$ and $P'_B$) will be:

$$P'_A = 1-(1-P_{16}(1))^{s \times K}$$

$$P'_B = 1-(1-P_{16}(2))^{s \times K}$$

Obviously, $$P'_A < P_A = P_B < P'_B, \text{ since } P_{16}(1) < P_{16}(2).$$

It shows the error rate of block A is lowered and that of block B is increased after BR. As blocks are transmitted over multiple hops, block A is with much higher probability to be error free than before.

Based on the intuition above, The BR is designed to improve the throughput in multi-hop mode of wireless networks. The BR algorithm for 16 QAM is shown in Algorithm 1, where protected coded blocks (the odd numbered coded blocks in the algorithm) are scattered to the good bit positions (odd numbered bit positions); the rest coded blocks (even numbered coded blocks in the algorithm) are scattered to bad bit positions (even numbered bit positions). Similarly, the algorithm for 64 QAM modulation (Algorithm 2) is designed, where the blocks are divided into three classes according to the bit error rates on different bit positions. In the networks employed BR, each node will check whether BR is applied on the received packets. If so and a different modulation scheme would be used in the transmission on next hop, bit restoration should be performed. After that, BR will be performed on the transmission of the next hop.

---
Algorithm 1 BR: 16QAM
---

```
for i = 1 to n do
    // n denotes the batch size
    if mod(i, 2) = 1 then
        for j = 1 to s do
            // s denotes the number of bits in one block
            r((i − 1) * s + 2 * (j − 1) + 1) = b((i − 1) * s + j) // b(t) denotes the
            tth bit in data input stream (bit stream of coded blocks) before BR
            is performed; r(u) denotes the uth bit in data output stream after
            BR is performed.
        end for
    else if mod(i, 2) = 0 then
        for j = 1 to s do
            r((i − 2) * s + 2 * (j − 1) + 2) = b((i − 1) * s + j)
        end for
    end if
end for
```

---
Algorithm 2 BR: 64QAM
---

```
for i = 1 to n do
    if mod(i, 3) = 1 then
        for j = 1 to s do
            r((i − 1) * s + 3 * (j − 1) + 1) = b_i(j)
        end for
    else if mod(i, 3) = 2 then
        for j = 1 to s do
            r((i − 2) * s + 3 * (j − 1) + 2) = b_i(j)
        end for
    else if mod(i, 3) = 0 then
        for j = 1 to s do
            r((i − 3) * s + 3 * (j − 1) + 3) = b_i(j)
        end for
    end if
end for
for i = 1 to n do
    for j = 1 to s do
        rb_i(j) = r((i − 1) * s + j) // rb_i(j) denotes the jth bit in the ith block
        after bit rearrangement
    end for
end for
```

The basic idea of BR is to prevent all blocks from sharing the same fate at the receiver side by protecting clean blocks against getting dirty while making dirty blocks dirtier. As random network coding is applied, all the linearly independent coded blocks are equally innovative. By collecting the clean protected blocks, the receiver is able to decode and get useful data. It is straightforward to obtain the expected block deliver rate with and without BR (denoted as TBR and T respectively) in single-link transmission as follows:

$$T_{BR} = \frac{1}{2}(1 - P'_A + 1 - P'_B) = \frac{1}{2}[(1 - P_{16}(1))^{s \times K} + (1 - P_{16}(2))^{s \times K}]$$

-continued $$T = 1 - P_A = 1 - P_B = (1 - P_{16}(1))^{\frac{s}{2} \times K}(1 - P_{16}(2))^{\frac{s}{2} \times K}$$

Note $(1.P_{16}(1))$, $(1.P_{16}(2))>0$. From the arithmetic/geometric mean inequality, it is obvious to obtain $T_{BR} \geq T$. Therefore, by applying BR, the throughput can be increased by collecting more clean blocks at the receiver.

Figure 24:
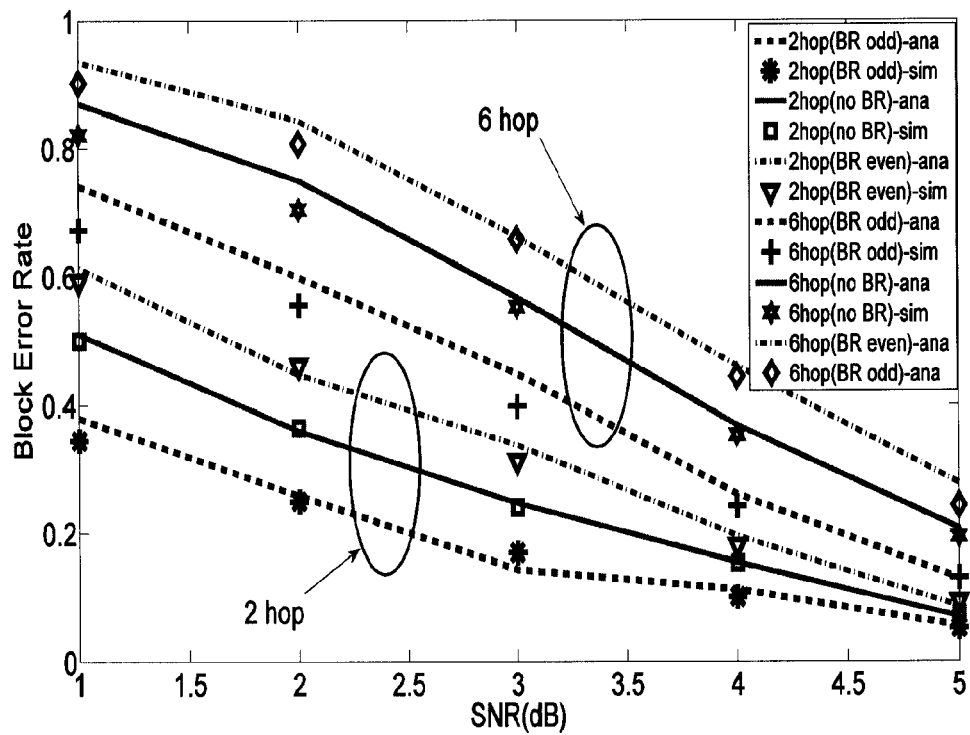
FIG. 24 shows a diagram illustrating a block error rates performance with and without BR under 2-hop and 6-hop transmissions using 16 QAM in AWGN channel.

FIG. 24 shows a diagram illustrating a block error rates performance with and without BR under 2-hop and 6-hop transmissions using 16 QAM in AWGN channel. As it can seen from the results of the FIG. 24, it could be easily observed that odd numbered blocks have much lower block error rates than those without BR, which shows that the odd numbered blocks are effectively protected.

Figure 25:
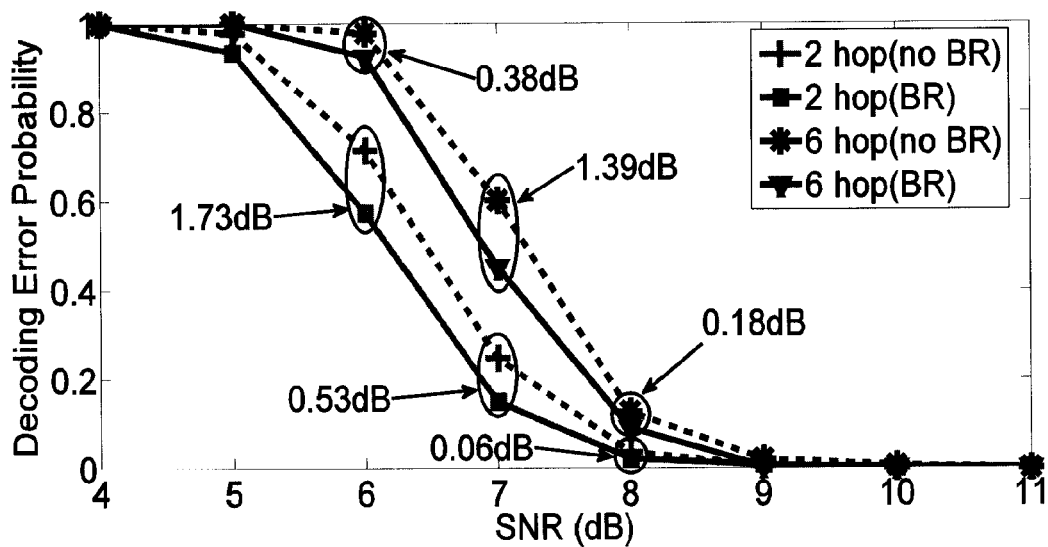
FIG. 25 shows a diagram illustrating a decoding performance of the present invention with bit rearrangement for 2-hop and 6-hop transmission using 16 QAM in AWGN channel.

FIG. 25 shows a diagram illustrating a decoding performance of the present invention with bit rearrangement for 2-hop and 6-hop transmission using 16 QAM in AWGN channel. As it can seen from the results of the FIG. 25, it could be easily observed that the decoding error probability at the receiver substantially decreased which means higher throughput can be achieved. The benefits are even larger when the number of hops increases. By separating the errors, BR algorithm is able to improve the throughput performance significantly.

The present invention differs from the previous work in a number of aspects. First, the concept of present invention jointly employs random network coding and soft value. With such proposed mechanism, random network coding is performed across the symbols within one packet rather than over different packets. Thus, the fine error control granularity of soft value and favorable rateless property of random network coding can be both fully exploited and potentially helpful to improve the performance significantly in multi-channel wireless networks. Second, the present invention is able to be performed with low cost. As compared to the traditional network coding scheme, the present invention employs new techniques including inner-packet coding, pre-generated coefficient matrix, and dynamic retransmission, with which signaling overhead and unnecessary redundant data transmission can be largely mitigated. In fact, the present invention can be introduced at almost free cost with the today's available technology. Third, the present invention is tightly designed for practical multichannel, e.g., OFDMA, based wireless networks while providing flexibility to be applicable to other types of wireless networks.

The present invention may provide a method for transmitting data in wireless communication system, the method comprising: dividing an input bit stream into segments; adding error detection code (CRC) into each segments of the divided input bit stream in order to generate a packet; dividing the generated packet into a plurality of blocks with fixed size; coding each of the plurality of blocks using a random linear coding in order to generate coded block bits; mapping the coded block bits to a plurality of modulated symbols; transmitting the plurality of modulated symbols; receiving a transmission request for one or more additional coded blocks; and transmitting the one or more additional modulated symbols, wherein the one or more additional coded blocks is coded using coefficient values that are different from coefficient values used in previous transmission, and the coded block bits in a coded block are rearranged according to a bit error probability.

It can be also said that the present invention may also provide a method for receiving data in wireless communication system, the method comprising: receiving a plurality of modulated symbols; demodulating the received plurality of modulated symbols to acquire a plurality of soft decision values; selecting coded blocks according to a confidence value related to the plurality of soft decision values; performing a random linear decoding with the selected coded blocks to restore a packet; checking an error of the packet using error detection code; and sending a transmission request for one or more additional coded blocks when the error of the packet exists, wherein the transmission request contains a number of additional coded blocks to be transmitted, the number of additional coded blocks are determined by comparing a threshold value with the confidence value of the coded blocks, the coded blocks are selected in descending order from a highest confidence value, the confidence value is an average of soft decision values of the coded block, the confidence value is decreased if one or more soft decision values of the coded blocks are less than a certain value, and the plurality of soft decision values are normalized-log likelihood ratios by a channel quality.

Also, the present invention may provide an apparatus for transmitting data in wireless communication system, the apparatus comprising: a packet generator adapted to generate a packet by adding error detection code into each segments of an input bit stream, wherein the generated packet is divided into a plurality of blocks with fixed size; an encoder adapted to code each of the plurality of blocks using a random linear coding in order to generate coded block bits; a modulator adapted to map the coded block bits to a plurality of modulated symbols; and an antenna adapted to transmit the plurality of modulated symbols.

Also, the present invention may provide an apparatus for receiving data in wireless communication system, the apparatus comprising: an antenna adapted to receive a plurality of modulated symbols; a demodulator adapted to demodulate the received plurality of modulated symbols to acquire a plurality of soft decision values, wherein coded blocks are selected according to a confidence value related to the plurality of soft decision values; and a decoder adapted to decode the selected coded blocks with a random linear decoding in order to restore a packet.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method for transmitting data in a wireless communication system, the method comprising:
dividing an input bit stream into segments;
adding error detection code into each segment of the divided input bit stream in order to generate a data unit;
dividing the generated data unit into a plurality of blocks with a fixed size;
coding each of the plurality of blocks using a random linear coding in order to generate coded block bits,
wherein a number of the generated coded block bits is determined by at least one parameter related to a given Galois field, and
wherein each coded block bit in a coded block is rearranged into different classes according to a bit error probability on a position of the coded block;
mapping the coded block bits to a plurality of modulated symbols;
transmitting the plurality of modulated symbols;
receiving a transmission request for one or more additional coded blocks including additional coded block bits mapped to one or more additional modulated symbols; and
transmitting the one or more additional modulated symbols,
wherein the one or more additional coded blocks are coded using coefficient values that are different from coefficient values used in a previous transmission.

2. A method for receiving data in a wireless communication system, the method comprising:
receiving a plurality of modulated symbols;
demodulating the received plurality of modulated symbols to acquire a plurality of soft decision values,
wherein the plurality of soft decision values are normalized-log likelihood ratios with consideration of a Signal to Noise Ratio (SNR);
selecting coded blocks according to a confidence value related to the plurality of soft decision values;
performing a random linear decoding with the selected coded blocks to restore a packet;
checking an error of the packet using error detection code; and
sending a transmission request for one or more additional coded blocks when the error of the packet exists,
wherein the transmission request contains a number of additional coded blocks to be transmitted, and wherein the number of additional coded blocks are determined by comparing a threshold value with the confidence value of the coded blocks.

3. The method of claim 2, wherein the coded blocks are selected in descending order from a highest confidence value.

4. The method of claim 2, wherein the confidence value is an average of soft decision values of the coded block.

5. The method of claim 2, wherein the confidence value is decreased if one or more soft decision values of the coded blocks are less than a certain value.

6. An apparatus for transmitting data in a wireless communication system, the apparatus comprising:
   a data unit generator adapted to generate a data unit by adding error detection code into each segment of an input bit stream,
   wherein the generated data unit is divided into a plurality of blocks with a fixed size;
   an encoder adapted to code each of the plurality of blocks using a random linear coding in order to generate coded block bits,
   wherein a number of the generated coded block bits is determined by at least one parameter related to a given Galois field, and
   wherein each coded block bit in a coded block is rearranged into different classes according to a bit error probability on a position of the coded block;
   a modulator adapted to map the coded block bits to a plurality of modulated symbols; and
   an antenna adapted to transmit the plurality of modulated symbols, receive a transmission request for one or more additional coded blocks including additional coded block bits mapped to one or more additional modulated symbols, and transmit the one or more additional modulated symbols,
   wherein the one or more additional coded blocks are coded using coefficient values that are different from coefficient values used in a previous transmission.

7. An apparatus for receiving data in a wireless communication system, the apparatus comprising:
   an antenna adapted to receive a plurality of modulated symbols;
   a demodulator adapted to demodulate the received plurality of modulated symbols to acquire a plurality of soft decision values,
   wherein coded blocks are selected according to a confidence value related to the plurality of soft decision values, and
   wherein the plurality of soft decision values are normalized-log likelihood ratios with consideration of a Signal to Noise Ratio (SNR); and
   a decoder adapted to decode the selected coded blocks with a random linear decoding in order to restore a packet, and check an error of the packet using error detection code,
   wherein the antenna is further adapted to send a transmission request for one or more additional coded blocks when the error of the packet exists,
   wherein the transmission request contains a number of additional coded blocks to be transmitted, and
   wherein the number of additional coded blocks are determined by comparing a threshold value with the confidence value of the coded blocks.

\* \* \* \* \*